May 5, 1959 R. K. WOLKE ET AL 2,884,684
APPARATUS FOR AUTOMATICALLY ASSEMBLING ELECTRON TUBE
PARTS TO FORM AN ELECTRODE CAGE
Filed Feb. 2, 1954 19 Sheets-Sheet 1

INVENTORS
Roy K. Wolke
John A. Chase &
Frank J. Pilas
BY William A. Balcsak
ATTORNEY

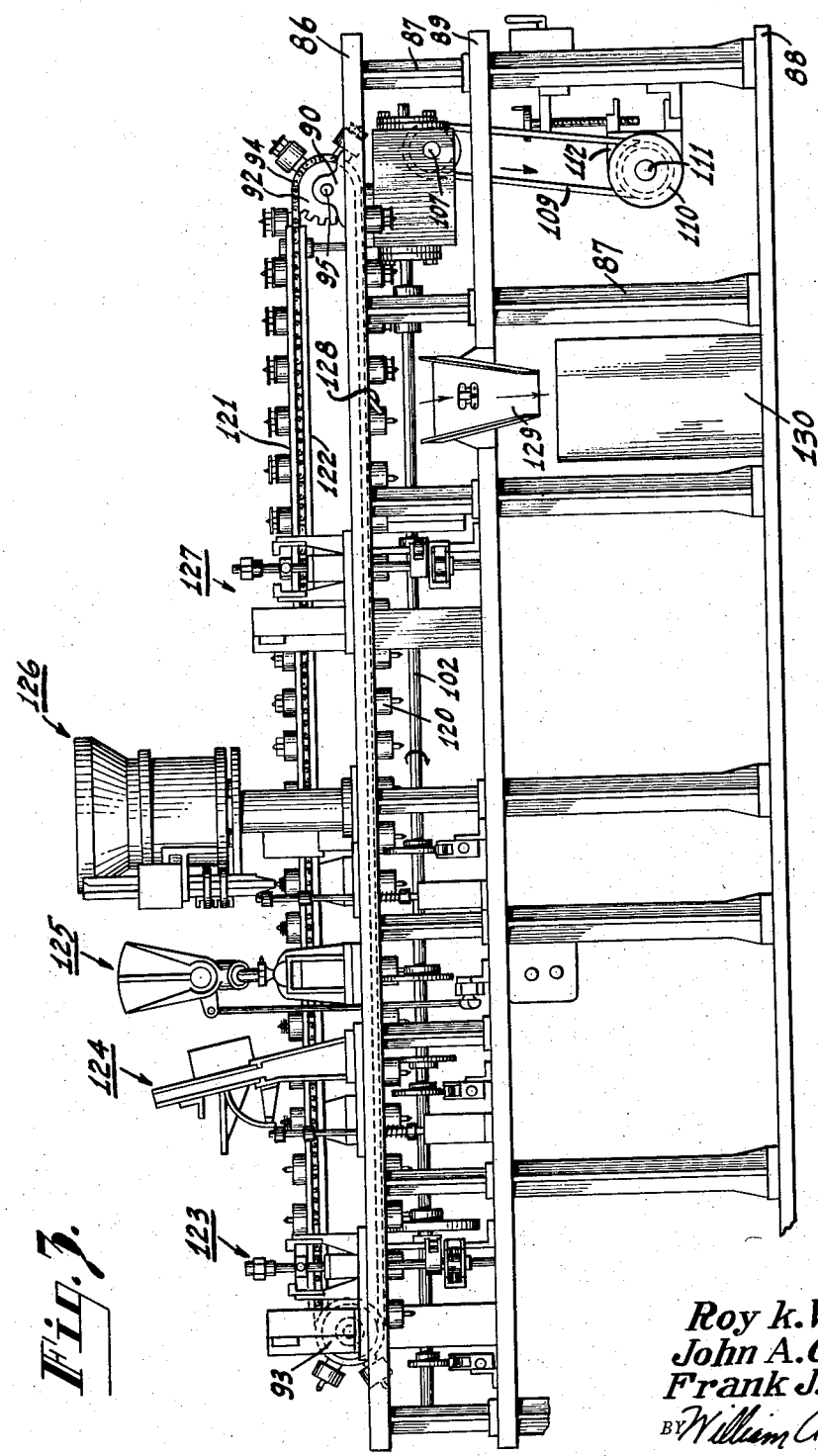

May 5, 1959 R. K. WOLKE ET AL 2,884,684
APPARATUS FOR AUTOMATICALLY ASSEMBLING ELECTRON TUBE
PARTS TO FORM AN ELECTRODE CAGE
Filed Feb. 2, 1954 19 Sheets-Sheet 3
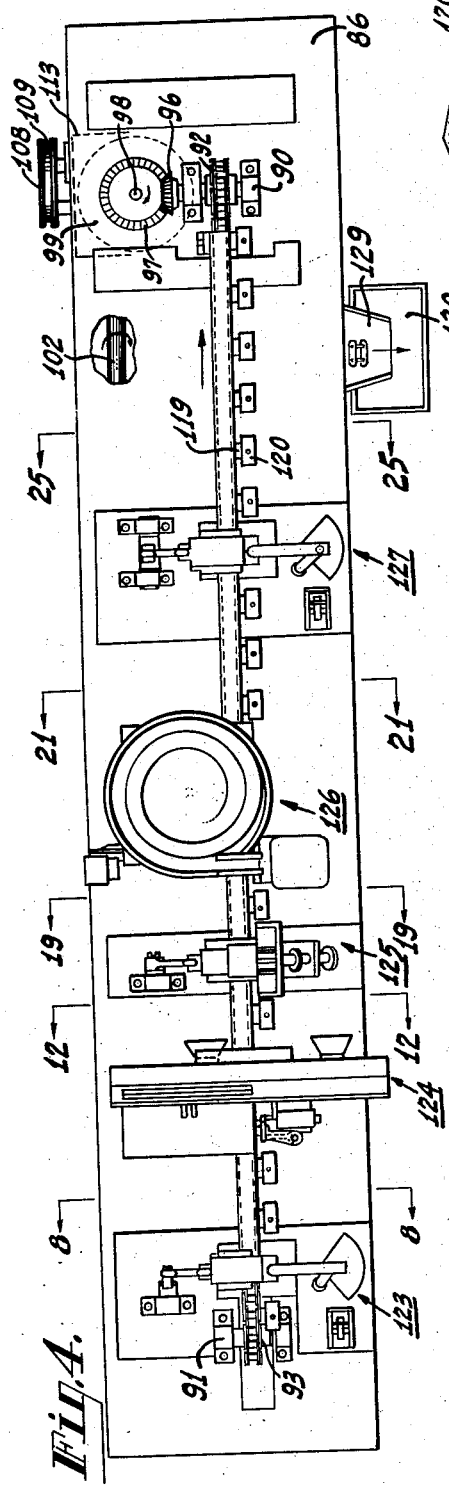
INVENTORS
Roy K. Wolke,
John A. Chase &
Frank J. Pilas
BY William A. Zalesak
ATTORNEY

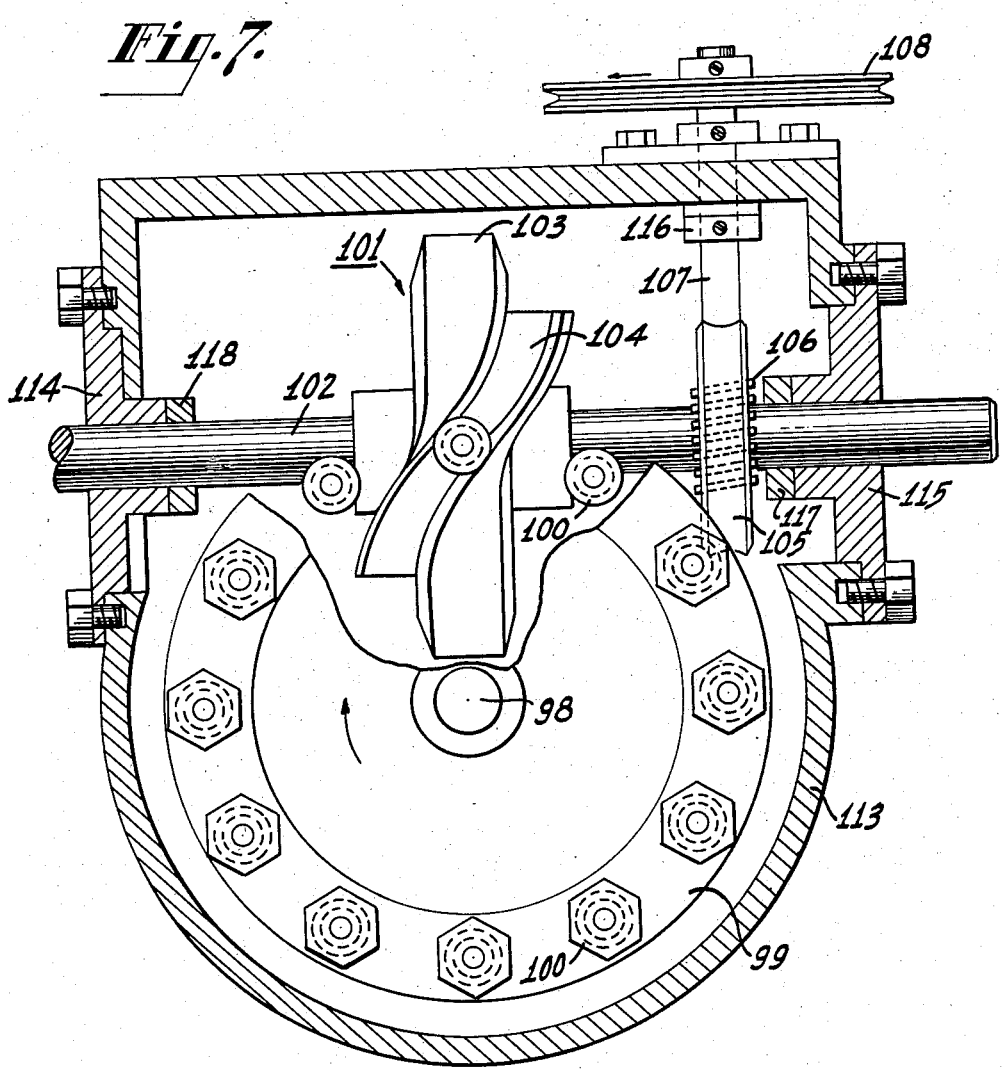

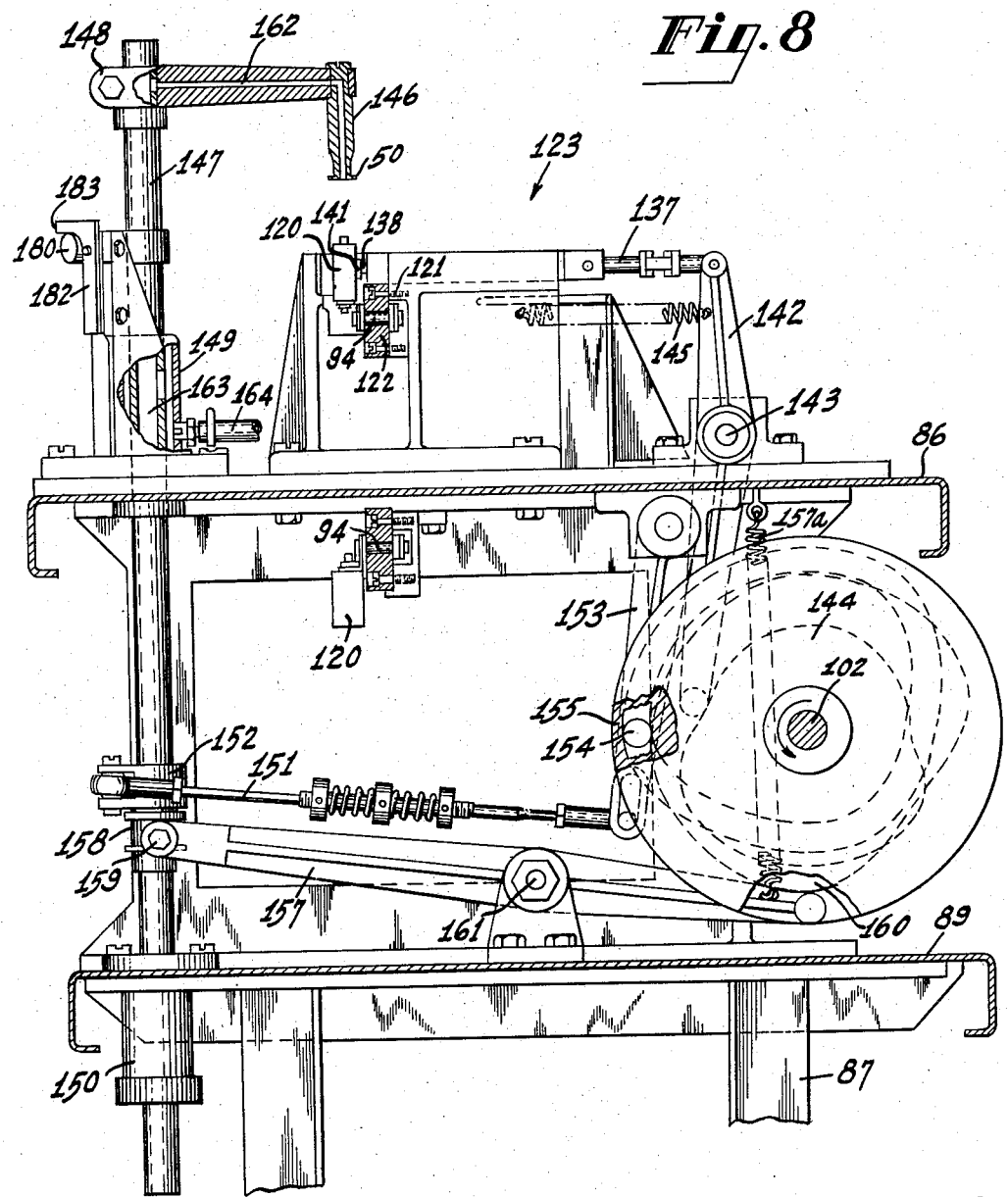

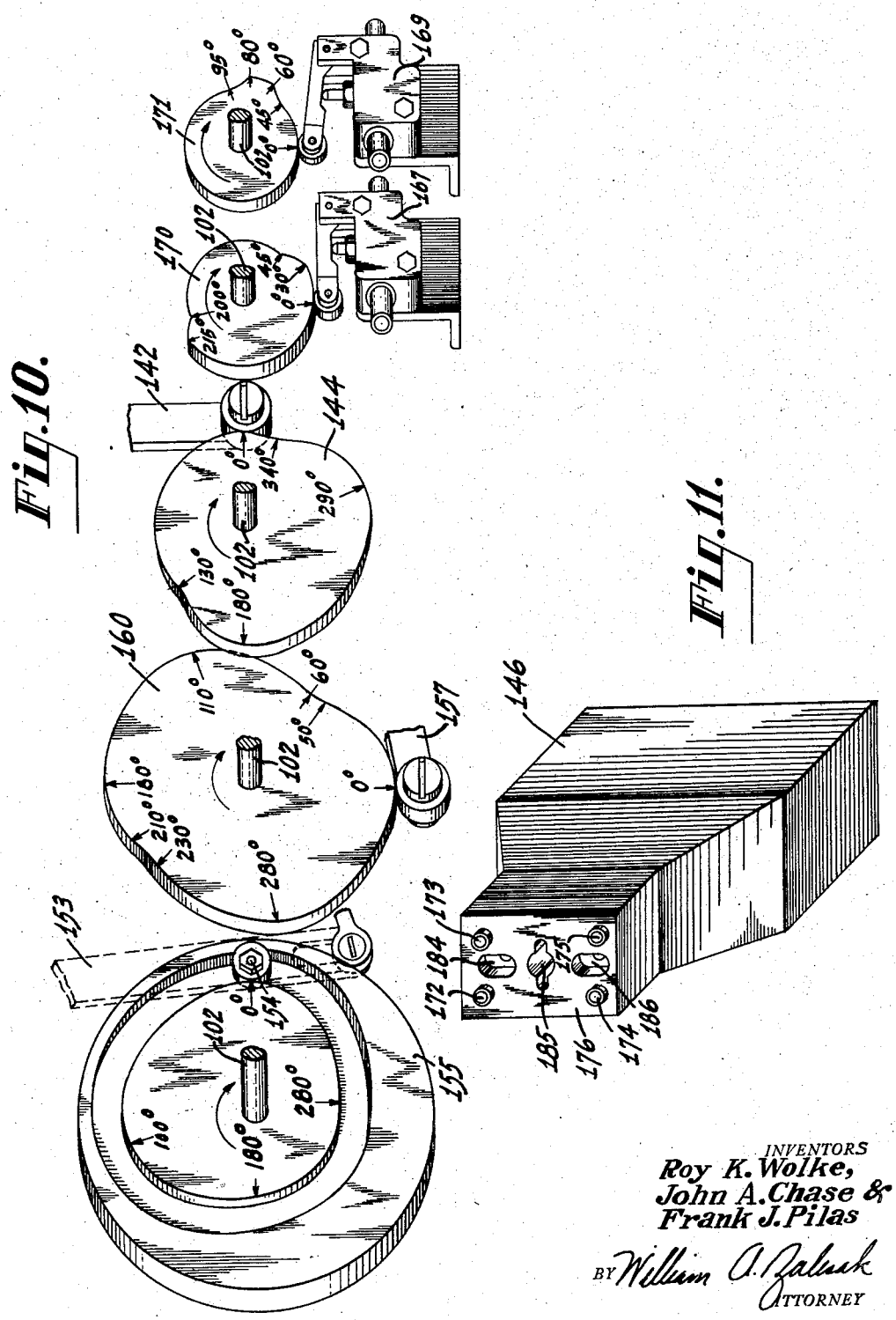

Fig. 12.

May 5, 1959  R. K. WOLKE ET AL  2,884,684
APPARATUS FOR AUTOMATICALLY ASSEMBLING ELECTRON TUBE
PARTS TO FORM AN ELECTRODE CAGE
Filed Feb. 2, 1954  19 Sheets-Sheet 10

INVENTORS
Roy K. Wolke,
John A. Chase &
Frank J. Pilas
BY William A. Zalesak
ATTORNEY May 5, 1959 R. K. WOLKE ET AL 2,884,684
APPARATUS FOR AUTOMATICALLY ASSEMBLING ELECTRON TUBE
PARTS TO FORM AN ELECTRODE CAGE
Filed Feb. 2, 1954 19 Sheets-Sheet 11
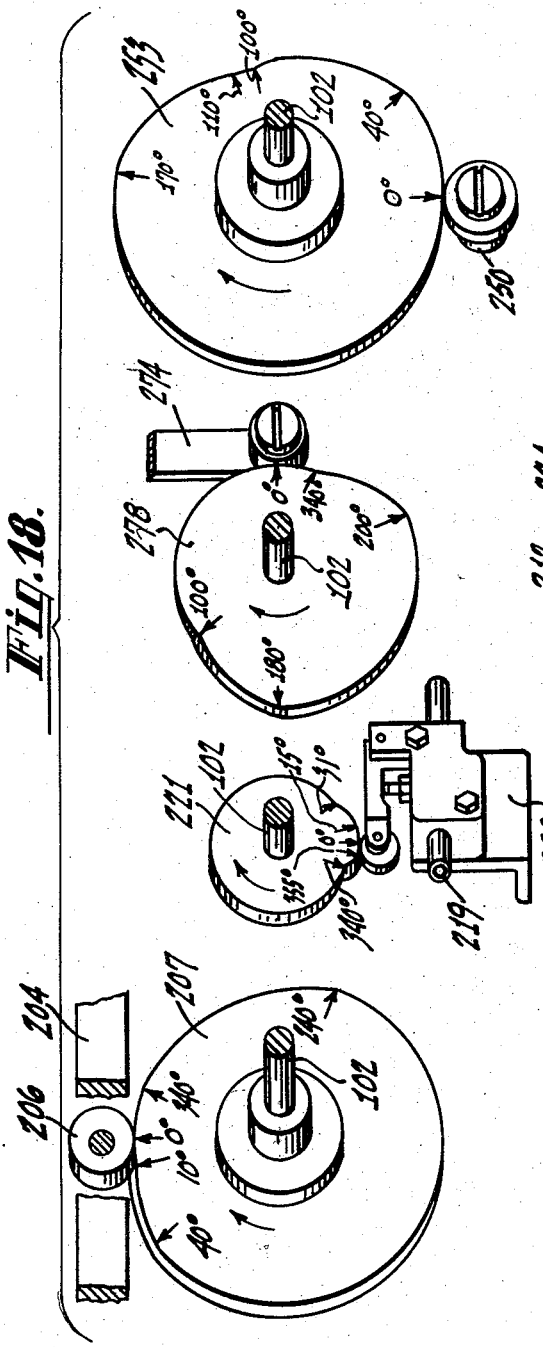
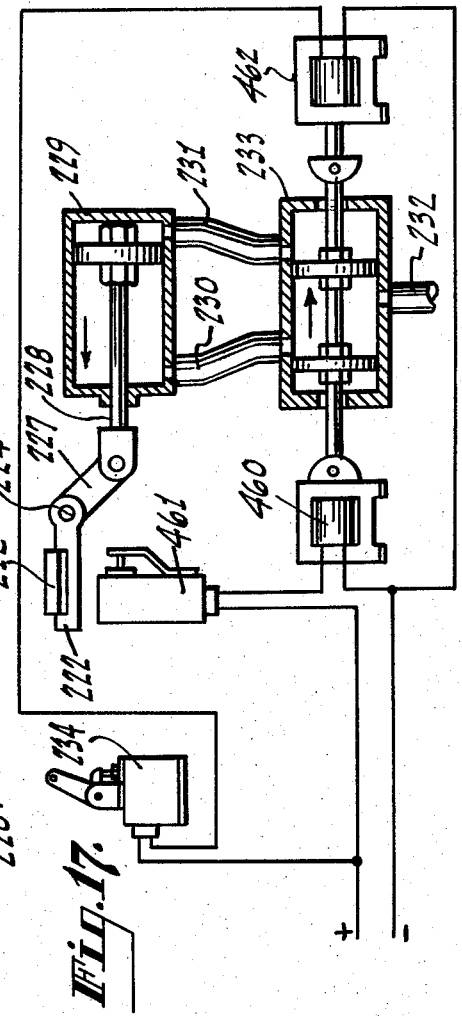
INVENTORS
ROY K. WOLKE
JOHN A. CHASE &
FRANK J. PILAS
BY William A. Zalesak
ATTORNEY

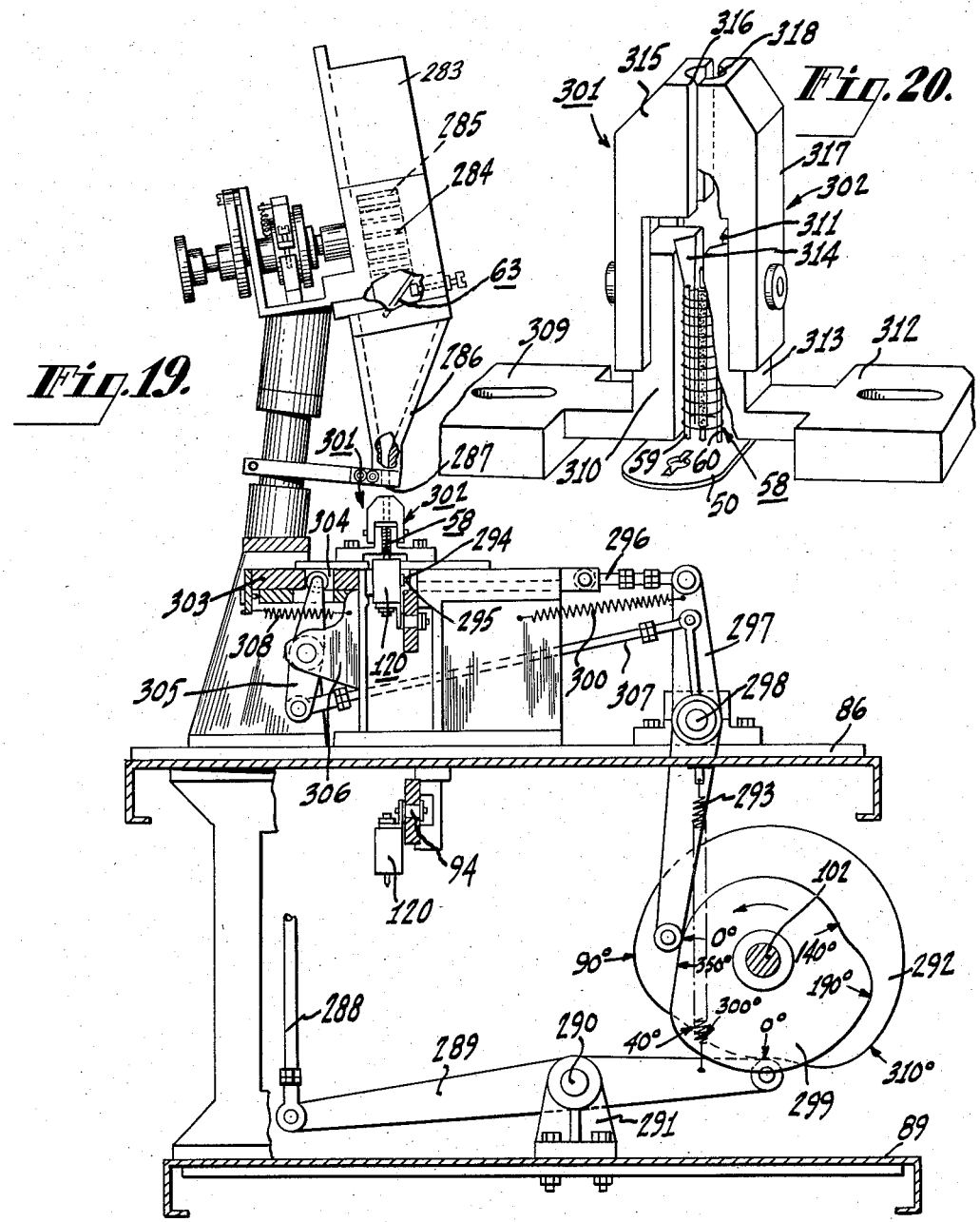

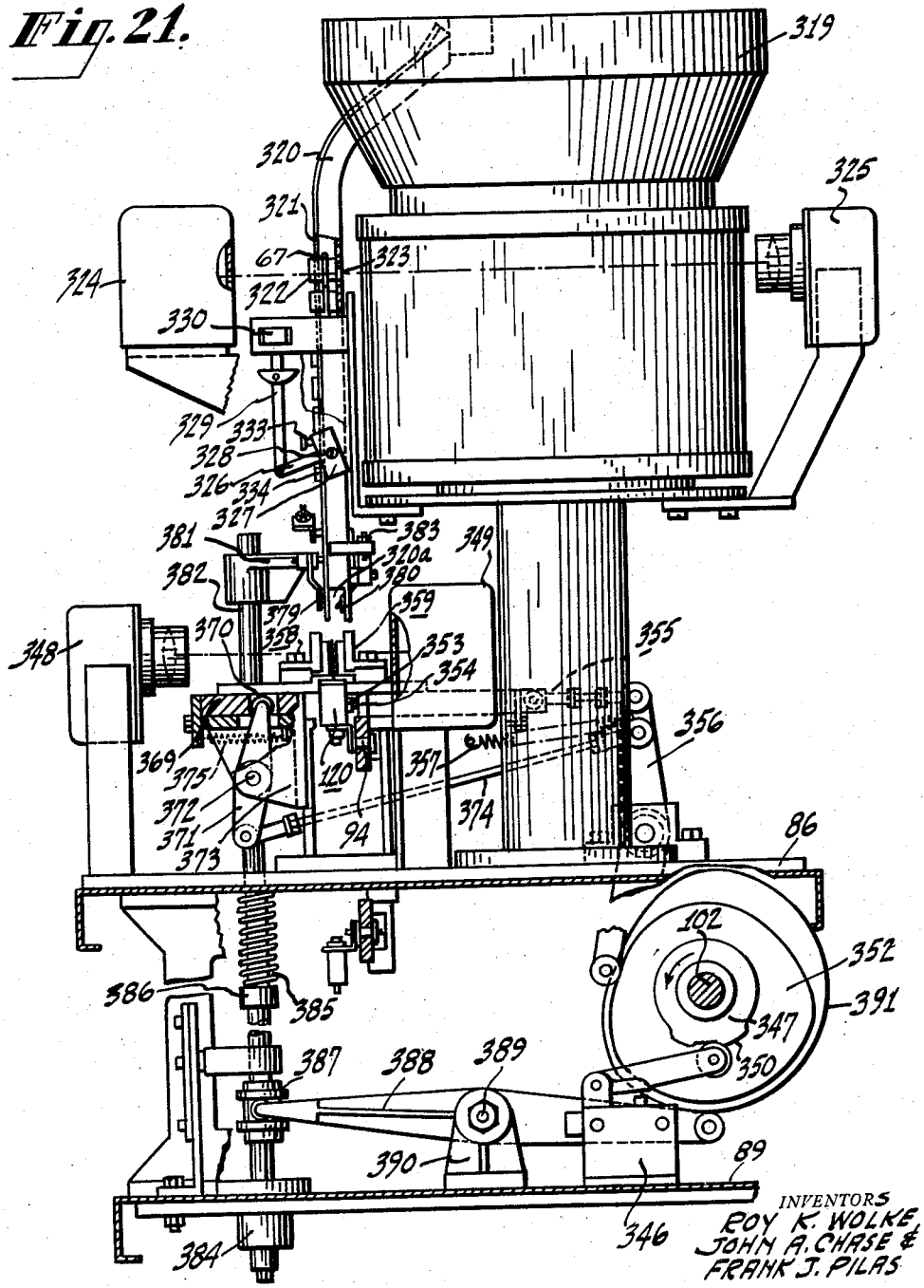

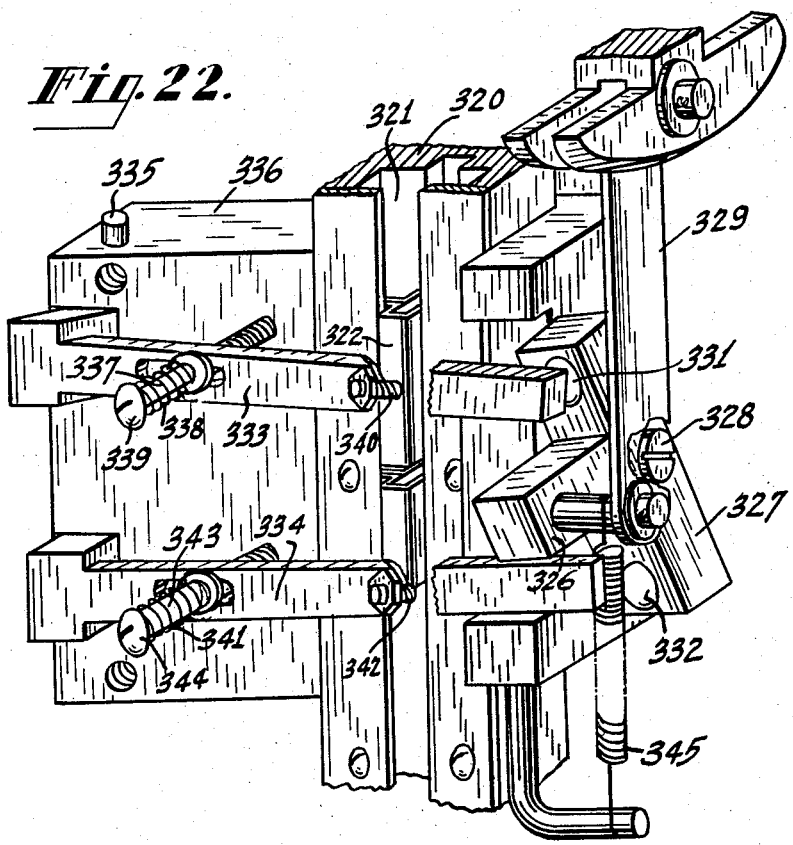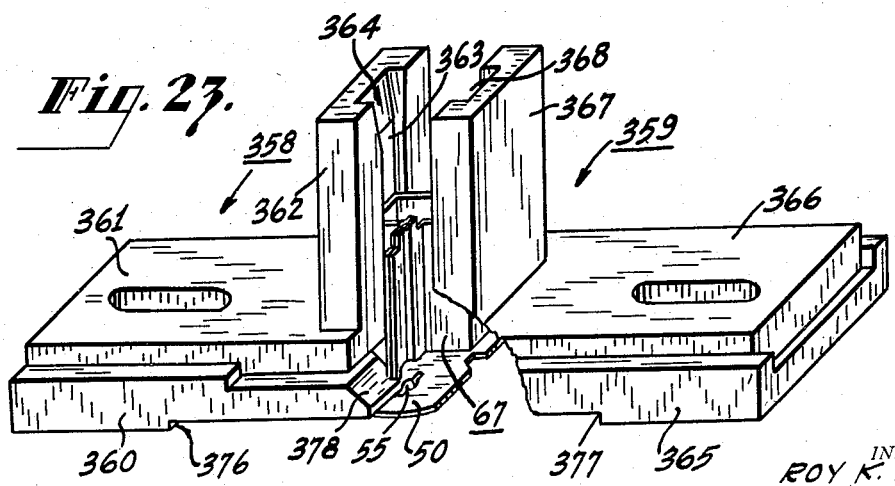

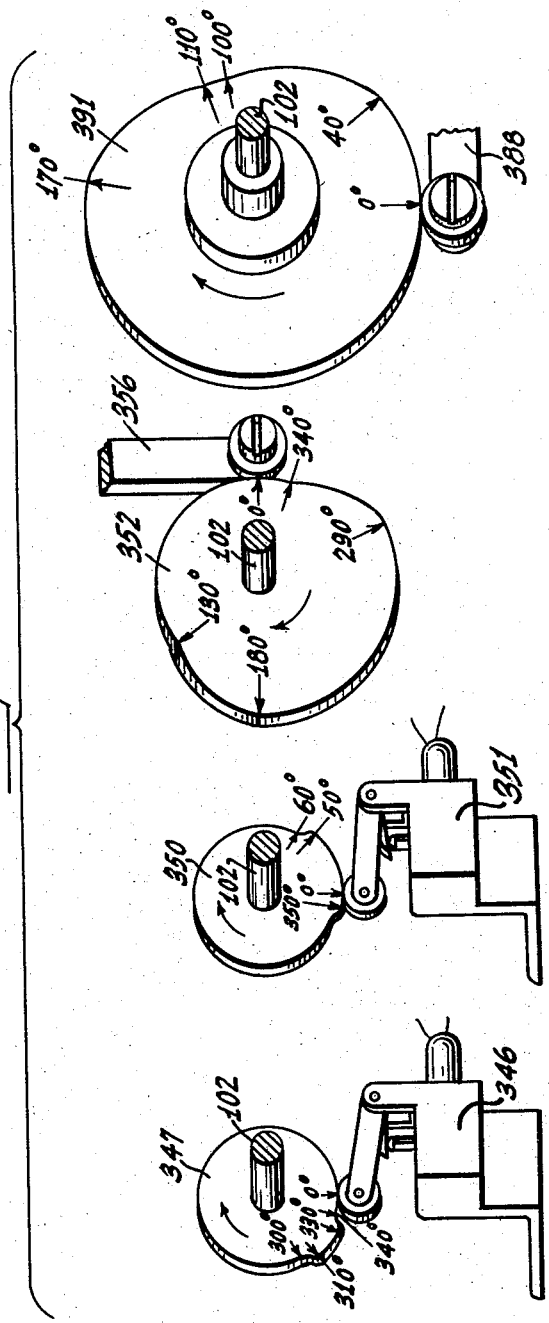

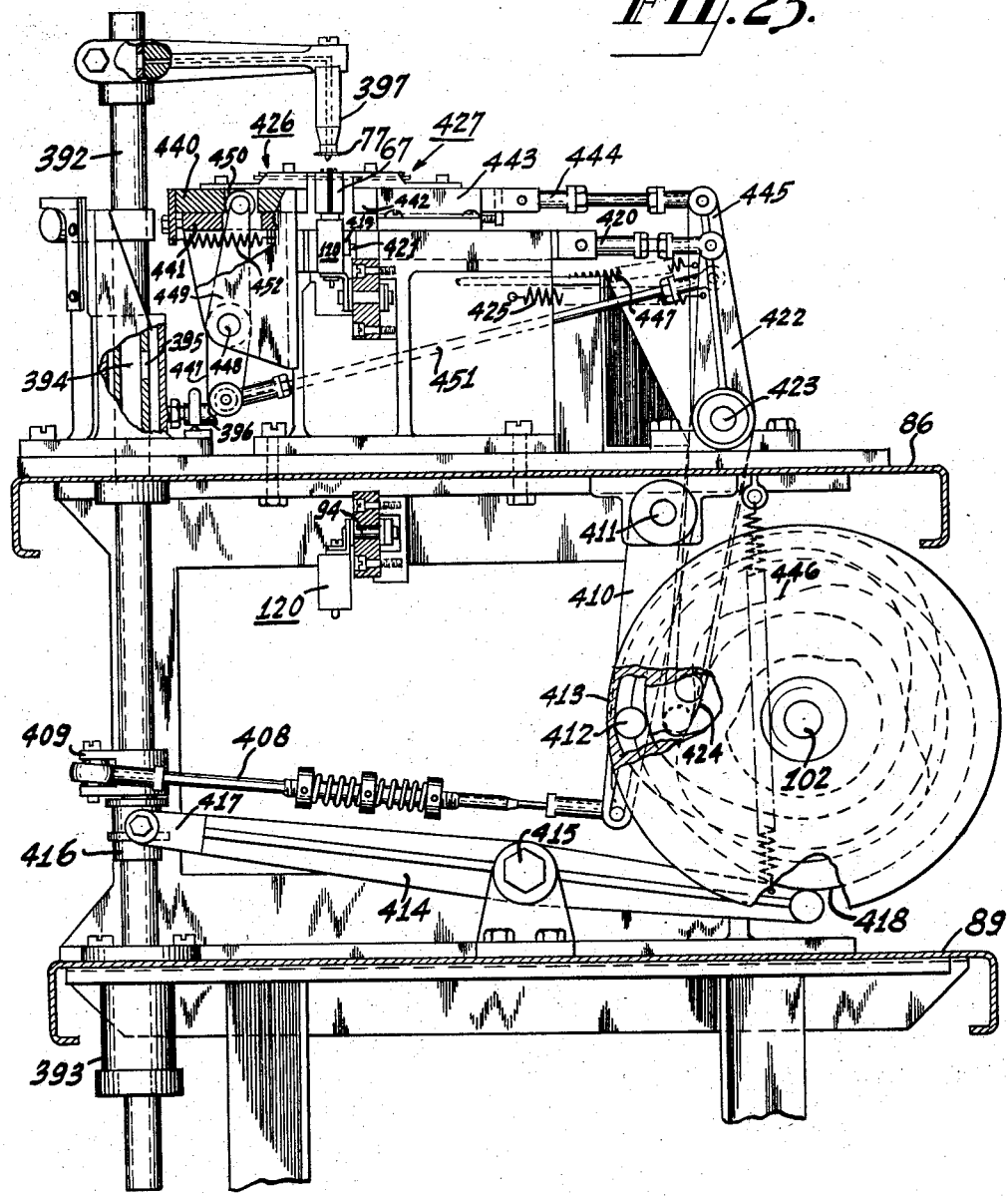

INVENTORS
ROY K. WOLKE,
JOHN A. CHASE &
FRANK J. PILAS
BY William A. Zaleski
ATTORNEY

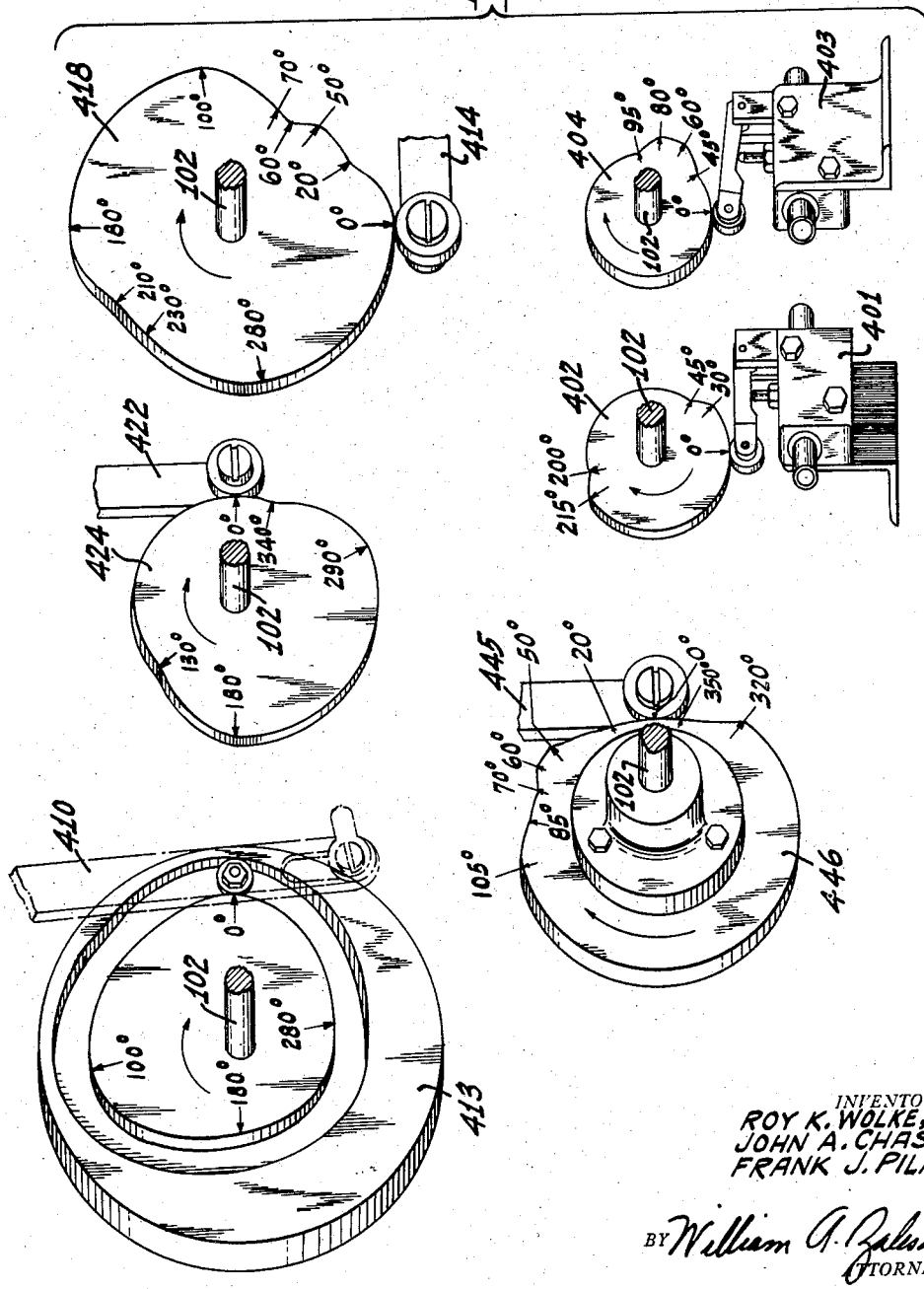

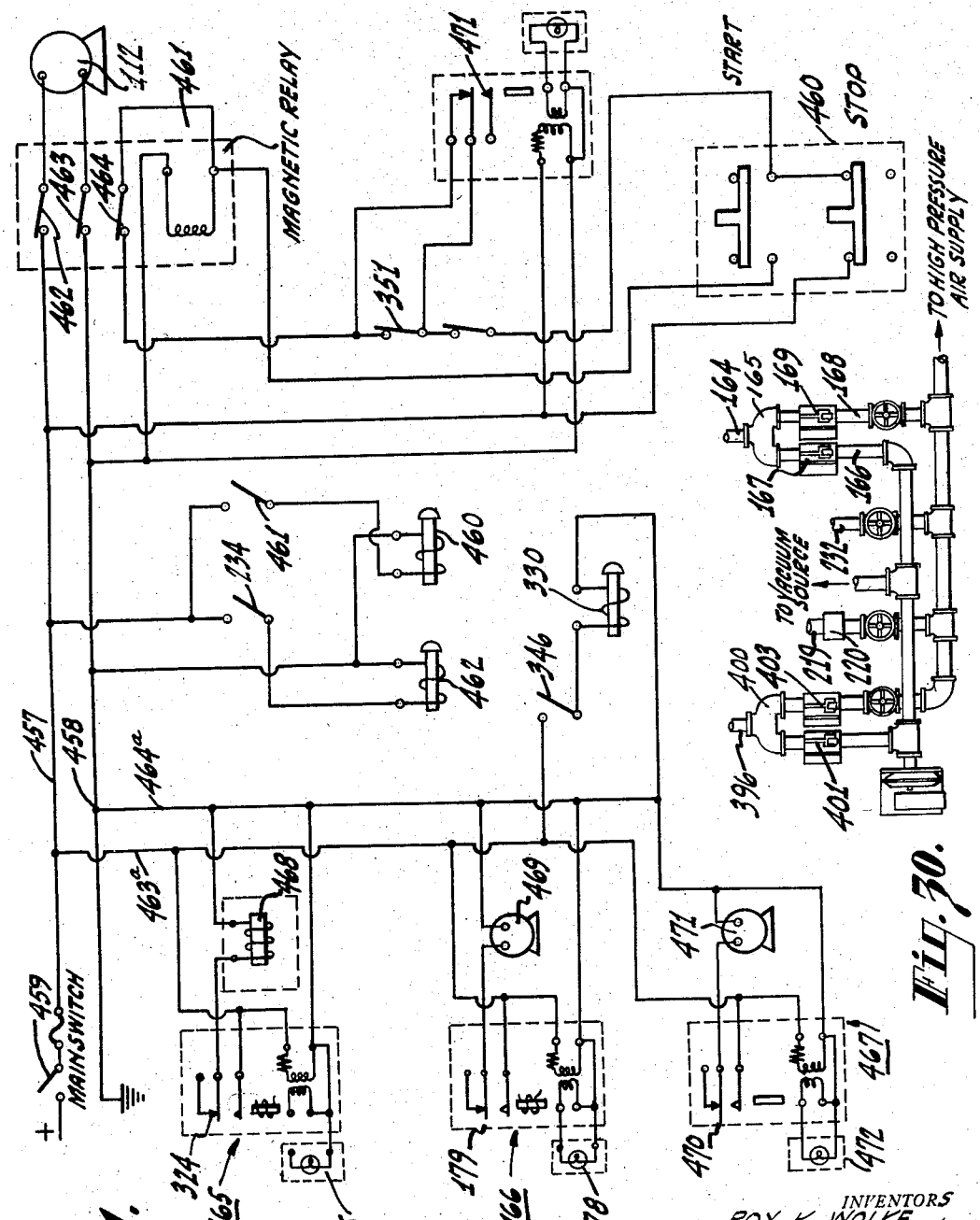

United States Patent Office 2,884,684
Patented May 5, 1959

2,884,684

APPARATUS FOR AUTOMATICALLY ASSEMBLING ELECTRON TUBE PARTS TO FORM AN ELECTRODE CAGE

Roy K. Wolke, Maplewood, John A. Chase, Nutley, and Frank J. Pilas, Lyndhurst, N.J., assignors to Radio Corporation of America, a corporation of Delaware Application February 2, 1954, Serial No. 407,758

29 Claims. (Cl. 29—25.19)

The invention relates to an apparatus for automatically assembling an electron tube cage from separate parts thereof, and more particularly concerns an automatically operable apparatus for assembling or mounting in a predetermined order and relationship a plurality of electron tube parts to form an electrode cage having two or more electrodes and adapted for service in an electron tube.

One form of electrode cage used in electron tubes comprises parts including two spaced parallel insulating spacer plates, made for example of mica, between which are supported a sleeve type cathode, a grid including side support rods having grid wire wound thereon, and a tubular anode. Heretofore these parts have been assembled manually.

One purpose of the invention is to provide an automatically operable apparatus for assembling or mounting the parts referred to in a predetermined sequence more quickly and more accurately than by manual means to provide an improved electrode cage of reduced cost.

It is a further purpose to provide improved loading and locating means for loading the parts referred to into desired positions for integration in an electrode cage.

In some electrode cage structures, the grid turns of the grid are relatively close to the cathode sleeve. Therefore, when the grid is mounted prior to the mounting of the cathode sleeve, it is necessary that the grid be very accurately positioned to avoid contact of its grid turns with the cathode sleeve during a loading of the sleeve, and that the loading of the cathode sleeve be very accurately controlled.

It is therefore a further object of the invention to provide means for accurately positioning the grid after a loading thereof and prior to a loading of the cathode sleeve.

Another object is to provide accurate guiding means for the cathode sleeve to further assure freedom from contact between the sleeve and the previously loaded grid during a cathode sleeve loading operation.

A grid of the type referred to is a relatively fragile structure and requires careful handling to preserve its initial shape. Any modification in such shape would seriously change from a desired value, the characteristics of an electron tube in which it is used, so as to render the tube unfit for its intended use. An automatic loading of a grid requires a reservoir of a plurality of grids and a successive feed of the grids to a jig on which the electrode cage parts are assembled.

It is accordingly a further object to provide a container or reservoir for a plurality of grids wherein the grids are supported and preserved from deformation.

Another object is to provide an impelling means providing a desired force distribution on a grid for feeding a grid to an assembling jig without deforming the grid.

A further purpose is to provide transit control means for impelling and guiding the feed of a grid from a position thereof in a reservoir to a position adjacent an assembling jig, while preserving the grid from deformation.

It is desirable for appropriate mounting that the three electrodes referred to penetrate a first loaded spacer plate by extending through apertures provided therein. Not all of the electrodes, however, can accomplish the desired penetration merely by the force of a free fall thereof from a loading mechanism to an assembling jig. This is particularly true in connection with the grid, due to the light weight thereof. Its weight in falling would be ineffective to cause its side rods to enter appropriate apertures in the plate. This problem is not appreciably severe in connection with the cathode sleeve, as will be evident in the following.

Therefore, it is another purpose of the invention to provide an automatic assembling apparatus having auxiliary means for effecting penetration by the anode and grid of the first loaded spacer plate to accomplish a desired mounted engagement between these two electrodes and the spacer plate.

For convenience and economy in servicing, it is desirable that the several loading means comprise individual and spaced units. This gives rise to a problem of properly coordinating, not only the operations of the several loading means, but also the operation of the assembling jigs, to assure a desired smooth and sequential mounting of the cage parts aforementioned.

It is accordingly another object of the invention to provide a common actuating means for all of the loading units and all of the assembling jigs of the apparatus to assure a desired accurate and sequential mounting of the parts referred to.

The foregoing purposes and objects are accomplished by the apparatus of the invention as a consequence of novel and advantageous structural features thereof. These features will become evident from the following brief description of one form of the apparatus of the invention.

One form of the apparatus of the invention includes an endless chain movable on two horizontally spaced bearings to provide an upper and a lower course. Fixed to the chain and spaced equidistantly from each other are at least five mounting or assembling tools or jigs adapted to receive in a predetermined order five electrode cage parts for build-up thereon of a completed triode type of electrode cage. These five cage parts comprise two insulating spacer plates, a cathode sleeve, an anode and a grid. The tools or jigs referred to extend radially from the chain, so that when they appear on the upper course, they extend upwardly, and when on the lower course, they extend downwardly. The jigs referred to may be provided with three relatively short mandrels, two of which may serve as guides for the anode, and the third of which may function in connection with the cathode sleeve. The two bearings referred to are spaced sufficiently to provide an upper course having a length for traversing five individual and spaced mechanisms for loading the five parts referred to, for build-up of a completed electrode cage.

The five loading mechanisms are mounted on a fixed support adjacent to the upper course of the chain to facilitate the several operations of loading cage parts on the jigs fixed to the upper course referred to.

It will be apparent from the foregoing that the movements of the jigs must be carefully coordinated with the actuations of the loading mechanisms to permit a step by step build-up on a jig of all the parts dispensed by the several loading mechanisms for completion of an electrode cage. This coordination is secured according to the invention by a common power source for actuating the endless chain and for actuating each of the loading mechanisms aforementioned.

The several means referred to coact to provide an assembled electrode cage from spaced supplies of parts thereof. The coaction between operating elements of the apparatus of the invention is smooth and extremely accurate, to avoid damage to delicate parts handled and to provide an electrode cage observing very close tolerances. Since the several cycles of the apparatus are subject to the same control, and since, as will appear more clearly hereinafter, the organization of the apparatus is designed to minimize wear of moving parts thereof, it is apparent that a plurality of electrode cages assembled by the apparatus will be characterized by a very high degree of uniformity. This is of appreciable significance in assuring uniform characteristics of several electron tubes incorporating electrode cages assembled by the apparatus of the invention.

Further purposes and features of the invention will become evident from the following and more detailed description of an embodiment thereof taken in connection with the appended drawing wherein the figures thereof are grouped in several categories to facilitate a description of the embodiment aforementioned.

Figures 1 to 7 of the drawing show general aspects of an automatic mounting apparatus embodying the invention. Of these figures, Figure 1 is an exploded perspective view of the five components assembled by the apparatus to provide an electrode cage, Figure 2 is a perspective view of the electrode cage formed by appropriate assembly of the parts shown in Figure 1;

Figure 3 is a view in elevation of the apparatus incorporating the invention for automatically mounting the parts shown in Figure 1 to provide the cage shown in Figure 2;

Figure 4 is a plan view of the apparatus shown in Figure 3;

Figure 5 is a perspective view of a movable loading tool or jig of the apparatus of the invention;

Figure 6 is an enlarged side elevation of the cam system included in the apparatus; and Figure 7 is a view partly in section, of a mechanism suitable for imparting intermittent movements to a conveyor portion of the apparatus.

Figure 9:
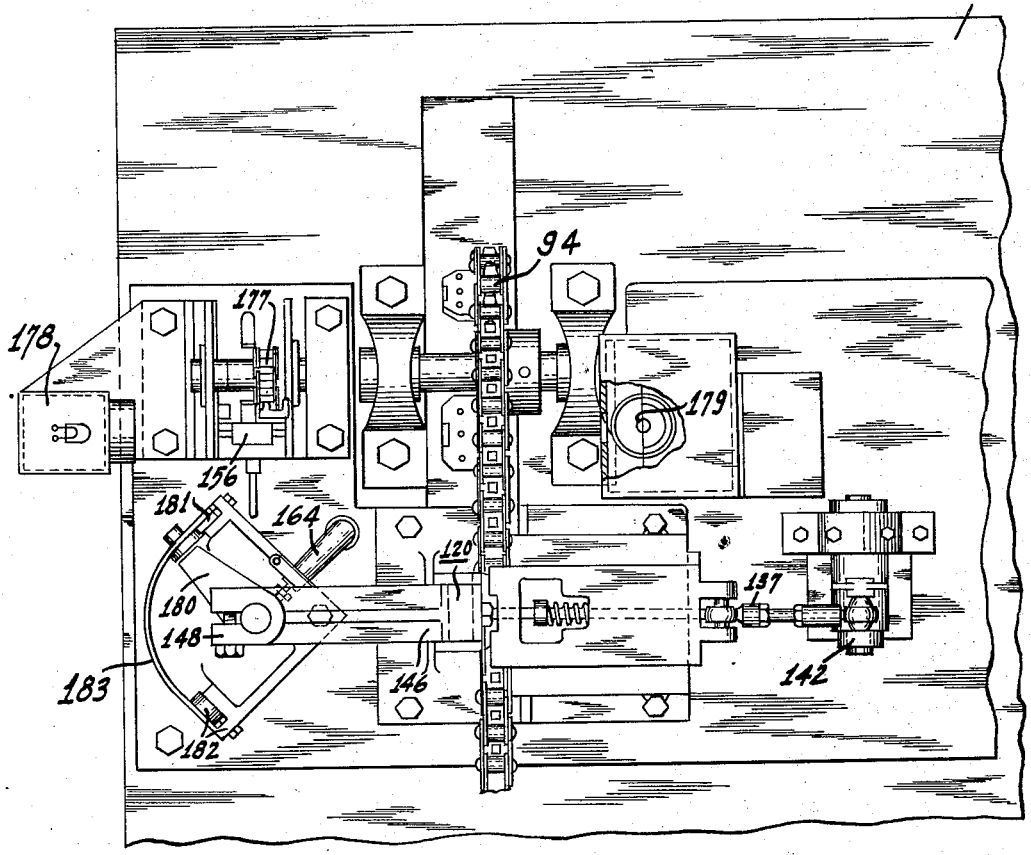

Figures 8 to 11 of the drawing depict a mechanism of the apparatus, for loading an initial electrode cage part, which may be an insulating spacer plate. In these figures Figure 8 is an elevation partly in section taken along line 8—8 of Figure 4 and shows the spacer plate loading mechanism of the invention, Figure 9 is a top view of the loading mechanism shown in Figure 8;

Figure 10 is an exploded perspective view of the cam system associated with the loading mechanism illustrated in Figures 8 and 9; and Figure 11 is a perspective view of the spacer plate pick-up member of the mechanism shown in Figures 8 and 9.

Figure 12:
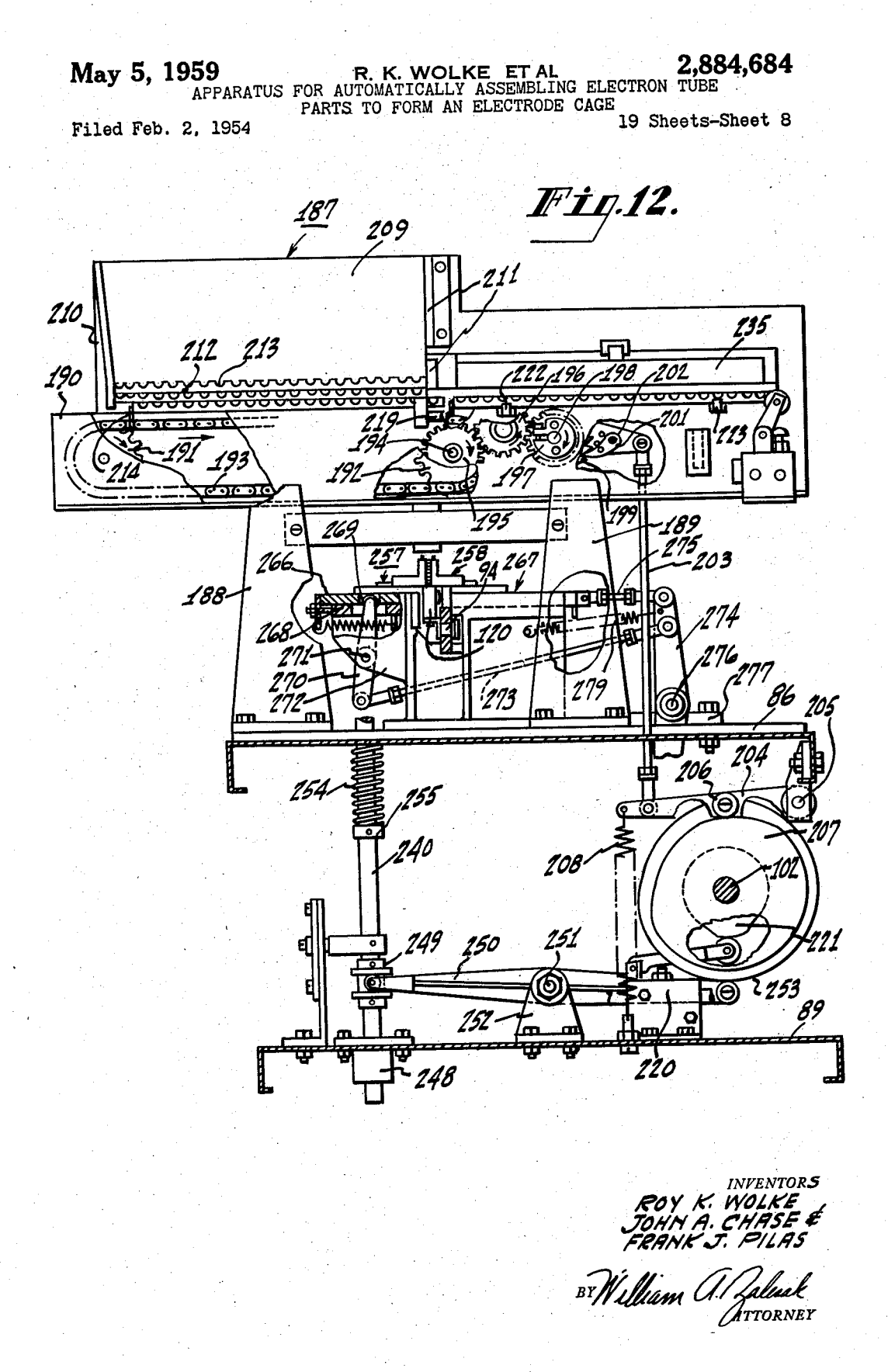
Figure 13:
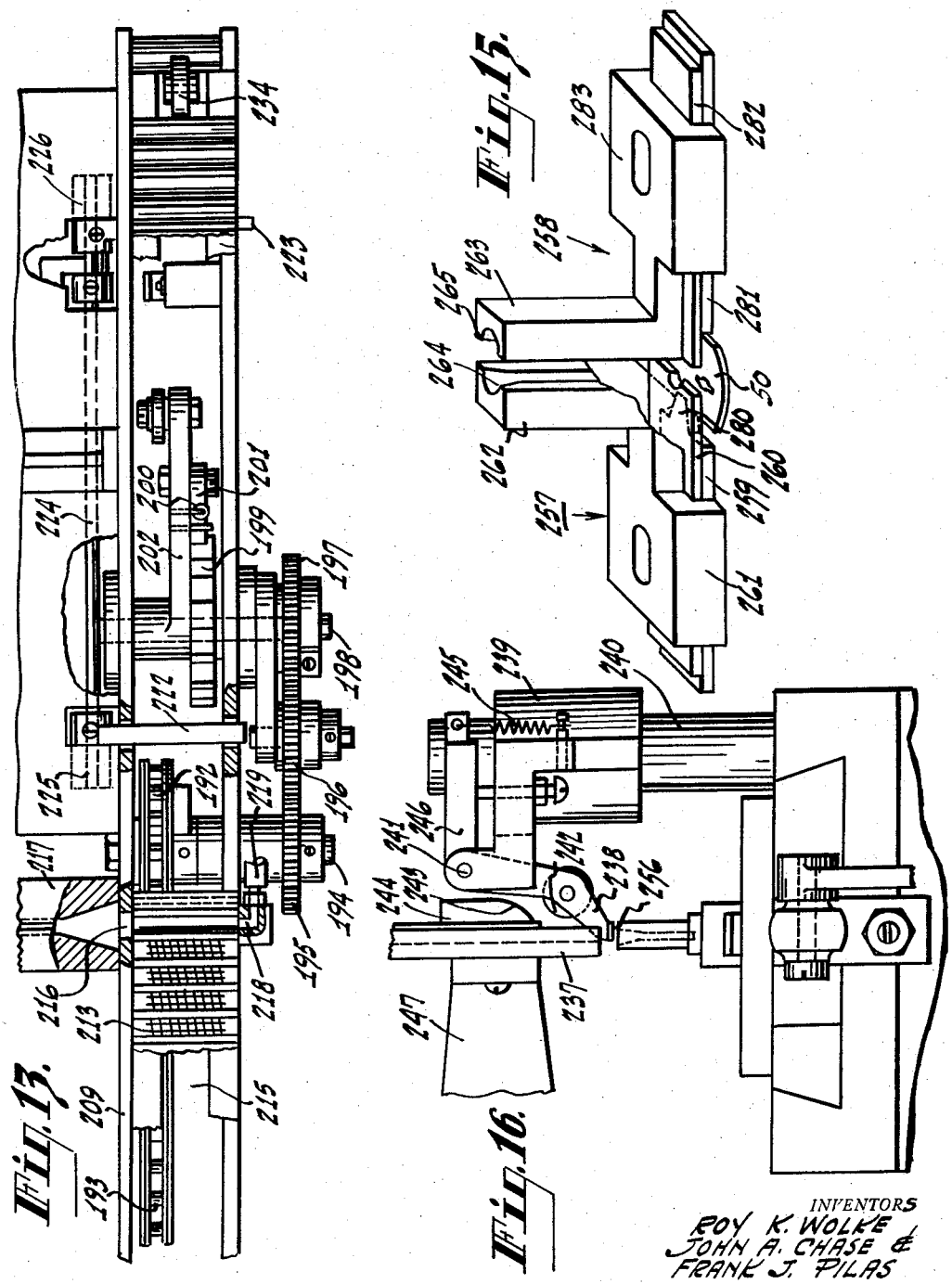
Figure 14:
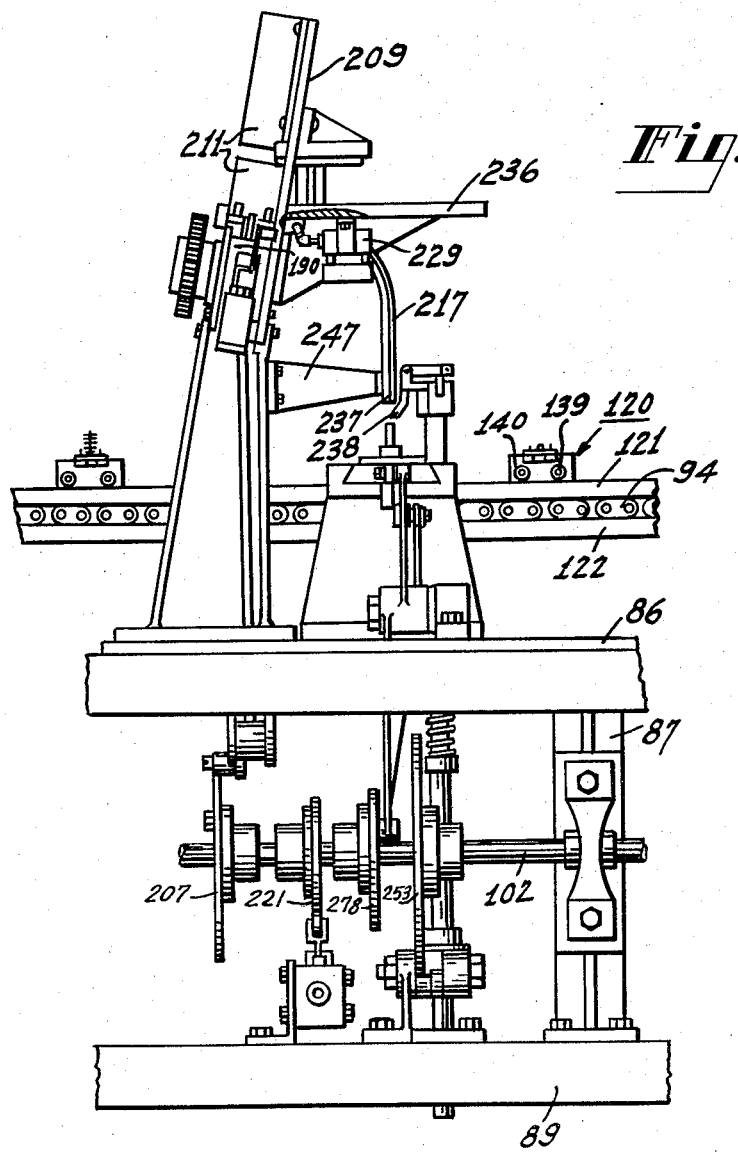

Figures 12 to 18 depict a grid loading mechanism that may be used in the automatic mounting apparatus of the invention. Considering these figures in more detail Figure 12 is an elevation partly in section of the grid loading mechanism, taken along the line 12—12 of Figure 4;

Figure 13 is a top view of the grid loading mechanism shown in Figure 12;

Figure 14 is a side view from the right of the grid loading mechanism depicted in Figures 12 and 13;

Figure 15 is a view in perspective of locating and guiding members for accurately orienting the first loaded insulating plate and guiding a grid to apertures in the plate;

Figure 16 is a fragmentary elevational view of a grid push-down device forming part of the grid loading mechanism shown in Figures 12 to 14;

Figure 17 is a schematic representation of a control feature of the grid loading mechanism; and Figure 18 is an exploded perspective view of the cam system used in the operation of the grid loading mechanism.

Figures 19 and 20 show a cathode loading mechanism useful in the apparatus of the invention, and more specifically Figure 19 is an elevation partly in section taken along the line 19—19 of Figure 4 and shows in general the cathode loading mechanism according to the invention; and Figure 20 is a perspective view of grid orienting and cathode guiding members used in the mechanism shown in Figure 19.

Figures 21 to 24 depict several views of an anode loading mechanism that may be included in the mounting apparatus of the invention. In these figures Figure 21 is an elevation partly in section taken along the line 21—21 of Figure 4;

Figure 22 is an enlarged perspective view of an anode feed control system used in the anode loading mechanism shown in Figure 21;

Figure 23 is a perspective view of anode guiding members used in the aforementioned anode loading mechanism; and Figure 24 is an enlarged exploded perspective view of the cam system associated with the anode loading mechanism.

Figure 26:
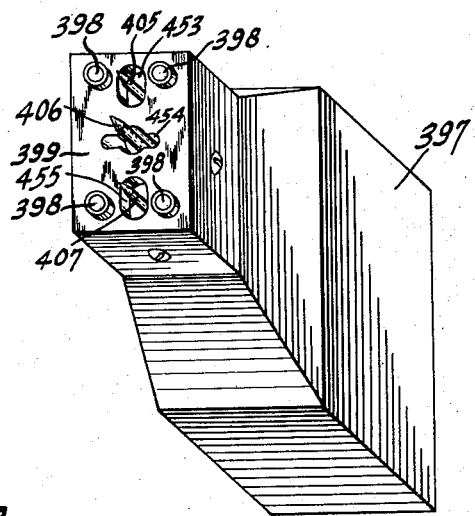
Figure 27:
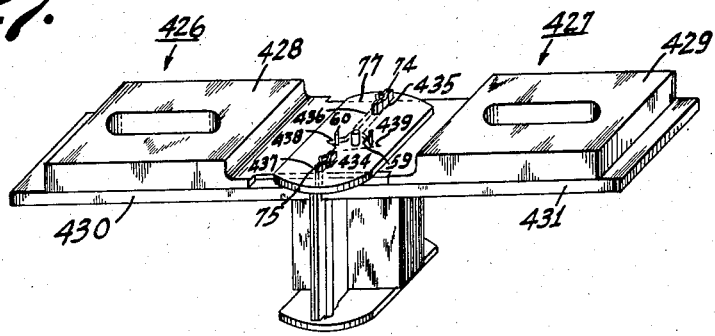
Figure 28:
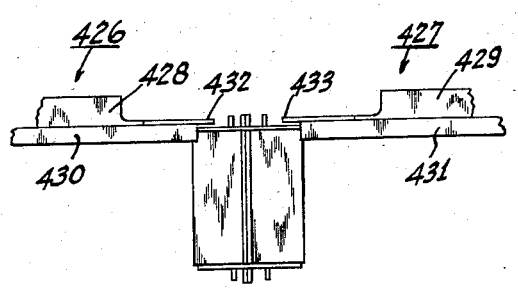

Figures 25 to 29 show several views of a mechanism for loading a second insulating plate for completing the assembly of an electrode cage. In this group of figures Figure 25 is a cross-sectional view taken along the line 25—25 of Figure 4;

Figure 26 is an enlarged perspective view of the pick-up or loading head employed in the loading mechanism under consideration;

Figure 27 is a perspective view of locating members for desirably orienting the free ends of the grid and anode for appropriate loading of the second insulator plate thereon;

Figure 28 is a fragmentary elevational view of the locating members shown in Figure 27 but in a position for locking the second insulator plate and the electrode cage completed thereby, against retraction by the pick-up or loading head; and Figure 29 is an enlarged exploded perspective view of the cam system serving the mechanism for loading the second insulator plate.

Figures 30 and 31 show general control features of the automatic mounting apparatus of the invention. In these figures Figure 30 is a schematic view of control elements employed to provide desired vacuum and air pressure conditions in various portions of the mounting apparatus during its operation; and Figure 31 is a schematic representation of control elements employed in the electrical circuit energizing the apparatus.

The order in which the foregoing groups of figures are presented is generally inconformity with the order of operation of the apparatus of the invention in mounting or assembling parts to form an electrode cage. The following brief description of the several groups referred to will aid in understanding the invention.

The first group, comprising Figures 1 to 7, illustrates general aspects of the automatic mounting apparatus of the invention. These figures depict the parts to be mounted by the apparatus and show features involved in the operation of all mechanisms of the apparatus.

The second group of figures including Figures 8 to 11, shows detailed structure of the first loading mechanism of the mounting apparatus. This loading mechanism serves to load the initial electrode cage part involved in a cage assembling operation according to the invention. This part is a flat insulating spacer plate, made for example of mica.

The third group of figures i.e., Figures 12 to 18, of the drawing depicts features of the second loading mechanism of the mounting apparatus. The function of this loading mechanism is to load a wound type grid into desired position with respect to the insulating plate previously loaded by the first loading mechanism. When in this desired position, the side support rods of the grid are extended at one end thereof into apertures provided therefor in the insulating plate. The second or grid loading mechanism referred to is characterized by several important features. One of these features concerns the reservoir or supply from which grids are fed during a grid loading operation. To protect the relatively fragile grid structures from deformation, this reservoir comprises a plurality of troughed trays. To provide continuity in the feed of grids from successive trays, the grid loading mechanism includes means for removing an empty tray from the path of a succeeding full tray and for conveniently storing a plurality of empty trays so removed to economize in operator attention. Another feature concerns means for impelling a grid from a tray into a chute having an exit end adjacent the first loaded insulating plate. This means comprises a jet of air adapted to direct an impelling force uniformly to all portions of a grid to avoid deformation thereof. A further feature of the grid loading mechanism comprises pushing means movable into the path of the grid in the chute for engaging the trailing end of the grid and urging it into appropriate apertures in the first loaded insulating plate. This feature is of advantage since the impelling force provided by the air jet aforementioned must be of an amplitude sufficiently small to avoid deforming the grid, and is almost totally absorbed by frictional engagement between the grid and the chute prior to entrance of the grid side rods into the apertures aforementioned. Still another feature of the grid loading mechanism relates to means for accurately locating the first loaded insulating plate with respect to the grid chute aforementioned to provide desired registry between the leading ends of the side rods of a grid fed by the chute, and spacer plate apertures aforementioned, for receiving the side rod ends referred to. This means may comprise oppositely disposed members movable to engage opposite edges of the first loaded insulating plate and to move the plate into the aforementioned desired registry. Also associated with the members referred to are two elongated members having complementary trough shaped facing surfaces extending from the exit end of the grid chute to a position close to the previously loaded insulating plate for providing a funnel for appropriately guiding a grid from the chute to the plate referred to. This guiding function is particularly desirable in view of the force of the pushing means aforementioned and the location of a portion of its application between the exit end of the chute and the insulating plate.

The fourth group of figures of the drawing, comprising Figures 19 and 20, concerns the cathode loading mechanism of the apparatus of the invention. This mechanism includes a drum type cathode loader and includes features of the cathode loader shown and described in copending application of applicants, Serial No. 279,804, filed April 1, 1952, now Patent No. 2,760,254, for Electrode Loading Apparatus, and assigned to the same assignee as the present application. However, certain novel features, not suggested in the aforementioned copending application, are incorporated in the cathode loading mechanism of the present invention. One of these features comprises combined locating and guiding members movable to accurately locate a grid previously mounted and to provide a guide or funnel coaxial with the grid for guiding a cathode through the space defined by grid turns of the grid to an aperture in the first loaded insulating plate. This feature is of prime importance since its function is to avoid contact between a cathode in transit to a loaded position, and the grid turns aforementioned. When the grid turns define a relatively narrow space, the locating and guiding members referred to are of particular value.

The fifth group of figures, including Figures 21 to 24, illustrates the anode loading mechanism of the invention. This mechanism includes some features, such as an anode reservoir and chute, shown and described in copending application, Serial No. 218,838, now Patent No. 2,842,832. In addition, it includes novel guiding means for guiding an anode from the exit end of the chute to a position where portions of its loading end engage apertures therefor provided in the first loaded insulating plate. It also includes novel push-down means for engaging the trailing end of an anode fed by the chute and urging the end portions thereof aforementioned into the plate apertures. The novel guiding means aforementioned prevents undesired displacement of the anode while engaged by the push-down means referred to.

The sixth group of figures, comprising Figures 25 to 29, depicts features of the fifth loading mechanism. This loading mechanism serves to load a second insulating spacer plate to cause apertures therein to receive end portions of the grid side rods, cathode and anode remote from the end portions therof engaged by the first loaded insulating spacer plate. This mechanism includes several novel features. One of these features resides in a loading head having mandrels extending from its spacer engaging surface, to not only desirably locate a spacer plate on said surface, but also to extend into one or more of the previously loaded electrodes, during a loading operation, for registering said electrodes with apertures in the plate. Another feature comprises locating means for engaging the free ends of the previously loaded grid and anode to dispose these ends in desired position for receipt by the spacer apertures aforementioned. The locating means also serves as a stripping means during retraction of the loading head after loading a spacer plate. The locating means referred to is actuated successively into two different positions to serve the two functions aforementioned.

The seventh group of figures, including Figures 30 and 31, is directed to general control features of the automatic mounting apparatus of the invention. One of these features, illustrated in Figure 30, involves control of vacuum and air pressure conditions at various portions of the apparatus. For example, each of the loading or pick-up heads employed at the first and fifth loading stations for loading insulating plates, is provided with a duct communicating with its parts-engaging surface, which is successively subjected to a vacuum condition for retaining a spacer plate, and to an air pressure condition for separating a loaded spacer therefrom. Portions of the apparatus requiring air pressure only, are the grid impelling jet means aforementioned, the means for moving empty grid trays to a storage position, and a stripping nozzle for stripping a completed cage from a mounting jig. Another of the general control features shown in this group of figures relates to the electrical supplies for several electrically energized components of the apparatus. These components include solenoids for effecting switching and valve control functions required during operation of the apparatus.

It will be apparent from the foregoing general description of the apparatus of the invention that each of the loading mechanisms mentioned is related in function to an adjacent loading mechanism to provide an interrelated system of mechanisms. Thus, the insulating spacer plate loaded by the first loading mechanism, is engaged and located more accurately by the succeeding grid loading mechanism. In turn, the loaded grid is engaged and located more accurately by the following cathode loading mechanism. And the fifth or second spacer loading mechanism provides for engagement by locating members of the loaded grid, cathode and anode to more accurately position them prior to loading the second plate. This double locating action, first by the loading mechanism loading a specific part and secondly by a succeeding loading mechanism, is of considerable value in providing an electrode cage wherein the electrodes observe extremely close space tolerances, and are uniform from cage to cage. Tests to which electron tubes incorporating such electrode cages have been subjected, reveal a faithful adherence of the tubes to predetermined characteristics, and uniformity of a plurality of tubes in respect of such characteristics. As a consequence, appreciable reduction in shrinkage during manufacture is realized, economy in labor is secured, and improved tubes are provided, by the automatic mounting apparatus of the invention.

A better understanding of the invention will be provided by a still more detailed consideration of the automatic mounting apparatus briefly described in the foregoing. This more detailed consideration will observe the groupings heretofore established in the interests of clarity of description.

General aspects of the apparatus

In describing general aspects of an automatic mounting apparatus according to the invention, for assembling or mounting electron tube parts to form an electrode cage, it will be advantageous first to consider the particular electron tube parts adapted to be mounted by the apparatus.

Figure 1:
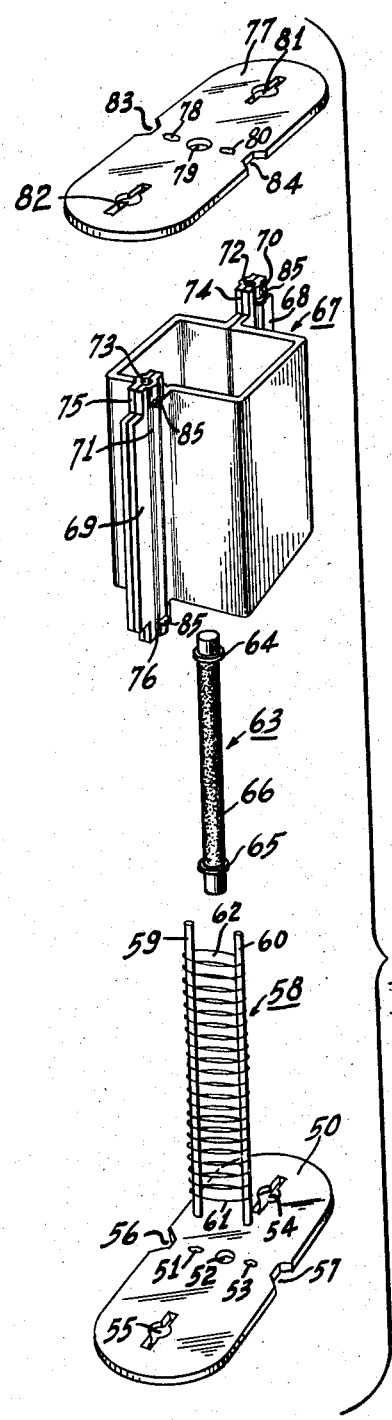

As shown in Figure 1, the electron tube parts aforementioned comprise an insulating spacer plate 50, made for example of mica, and having five apertures 51, 52, 53, 54, 55 and opposite edge indentations 56, 57; a wound type grid 58 having side support rods 59, 60, and grid turns 61 defining a tubular structure determining a space or passageway 62; a sleeve type cathode 63 having annular embossments 64, 65 and a coating 66 of electron emitting material; an anode 67 of tubular construction and having opposite outwardly extending side wings 68, 69 provided with embossments 70, 71 defining passageways 72, 73 and terminating in two ears 74, 75 extending from one end thereof and two ears extending from the other end thereof, one only of which is shown at 76; and an insulating spacer plate 77 which may be similar in composition and structure to spacer plate 50 aforementioned and which includes apertures 78, 79, 80, 81, 82 and opposite side indentations 83, 84. In addition, the anode embossments 70, 71, may be provided with dimples 85, or other locking embossments, such for example as shown and described in Patent 2,625,665 to W. K. Batzle and assigned to the same assignee as the present application, for locking the spacer plates 50 and 77 to the anode 67.

Figure 2:
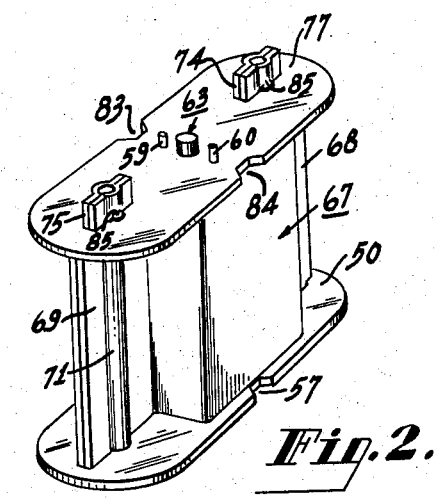

An electron tube cage including the parts referred to mounted by the apparatus to be described, is shown in Figure 2.

Figures 3 to 6 show general aspects of a mounting apparatus embodying the invention. Some details of the apparatus are omitted in these figures in the interests of clarity.

The apparatus referred to may include a table 86 supported on legs 87 resting on base 88 and having a shelf 89. Mounted on brackets 90, 91 fixed to the upper face of table 86, are two sprocket wheels 92, 93 which engage endless chain 94. Sprocket wheel 92 is fixed to shaft 95 to which is also fixed beveled spur gear 96 shown in Figure 4. Beveled spur gear 96 in turn engages beveled spur gear 97 fixed to shaft 98. Also fixed to shaft 98 and below the beveled gear 97 as viewed in Figure 4, is a disc 99 having a plurality of tapered pins 100 extending normally from a surface of the disc in a circular array concentric with shaft 98. Adjacent the disc 99 and in position for successively engaging the tapered pins 100, is a cam 101 fixed to shaft 102 and having a tapered dwell portion 103 and a tapered groove portion 104, the latter serving as a motion transmitting means. Rotation of shaft 102 through one revolution will cause one pin 100 to enter the groove 104 for rotating disc 99 through a partial revolution, and thereafter will cause the dwell portion 103 to enter the space between said one pin and an adjacent pin for holding the disc 100 stationary. Rotation of shaft 102 is accomplished by means of worm gear 105 fixed to the shaft and a worm 106 fixed to shaft 107. A pulley 108 is fixed to shaft 107 and engages a belt 109 shown in Figure 3. The belt 109 in turn engages pulley 110 mounted on shaft 111 connected to a motor 112. A housing 113, shown in Figure 7 may be provided for the disc 99, and cam 101. This housing provides or supports suitable bearings 114, 115 for shaft 102, and bearing 116 for shaft 107. To oppose axial thrusts produced on shaft 102 by cam 101 when in motion transfer relation to disc 99, collars 117, 118 fixed to shaft 102 are provided, which bear against fixed bearings 114 and 115 and cause said bearings to restrain axial displacement of shaft 102.

It will be noted from the foregoing that rotation of shaft 111 by motor 112 in the direction indicated by the arrow in Figure 3, will cause the upper course of endless chain 94 to move intermittently to the right as viewed in Figures 3 and 4. To produce a type of intermittent movement suitable for the apparatus being described, the dwell portion 103 of the cam 101 may extend through an arc of 240°, leaving an arc of 120° for the motion transmitting portion 104 of the cam referred to.

The angular relation of the motion transmitting portion 104 with respect to the dwell 103 of cam 101 is such as to produce an intermittent movement of chain 94 involving a predetermined magnitude of movement of the chain. Affixed to chain 94 by brackets 119 are a plurality of jigs or mounting fixtures 120, one of which is shown in detail in Figure 5. The jigs referred to are spaced from each other a distance equal to said predetermined magnitude of movement of the chain, for a purpose to be described. To restrain chain 94 from bowing or other displacement at its upper course from a rectilinear path, guide bars 121, 122 are provided for engaging the chain therebetween. Similar guide bars may be provided for the lower course of the chain, although the path travelled by this course is not as critical as that of the upper course.

Mounted on table 86, adjacent and spaced along the upper course of the chain 94, a distance of which the spacing between adjacent jigs is a multiple, are five parts loading mechanisms. The loading mechanisms are positioned so that each is adjacent one of the jigs during intervals when the chain 94 is stationary, for loading a part thereon. These mechanisms, in the order from left to right as viewed in Figures 3 and 4, comprise a first mechanism 123 for loading the first spacer plate 50 shown in Figure 1, a second mechanism 124 for loading the grid 58, a third mechanism 125 for loading the cathode sleeve 63, a fourth mechanism 126 for loading the anode 67, and a fifth mechanism 127 for loading the second spacer plate 77.

Shaft 102 referred to above in connection with Figure 7, extends parallel to the upper course of chain 94 and below table 86. It is supported for rotation in suitable bearings not shown. The shaft referred to is subjected to constant rotation by the engagement between worm gear 105 affixed thereto and worm 106 aforementioned. This constant rotation of the shaft 102 is utilized not only to provide intermittent movement to chain 94 and the jigs 120 mounted thereon, but also to actuate the several loading mechanisms referred to. The actuation of the several loading mechanisms is accomplished by engagement of cams fixed to shaft 102 with suitable elements of the mechanisms. These cams are for the most part, omitted from Figure 3 in the interests of clarity. They are, however, shown fully in Figure 6. For convenience, the cams will be considered in groups. The five cams of Group A, the four cams of Group B, the two cams of Group C, the four cams of Group D, and the six cams of Group E, serve to control the actions of the several loading mechanisms, 123, 124, 125, 126 and 127, respectively. The cams aforementioned are provided with risers and dwells so spaced around shaft 102 as to assure a loading action by the mechanisms only when jigs 120 are momentarily stationary in parts receiving positions adjacent the mechanisms.

It will be noted from the foregoing that a fixed relationship exists between the movements of the chain 94 and the movements of the cams aforementioned. This fixed relationship is provided by utilizing shaft 102 as a power transmission means both for the chain 94 with its jigs 120 as well as for the cams referred to. Therefore, as chain 94 travels from left to right as viewed in Figure 3, electron tube parts shown in Figure 1 will be successively loaded on jigs 120, until, as shown at the right of Figure 3, a complete electrode cage including anode 67 is formed. The completed cages continue to adhere to the jigs 120 until they reach a position on the lower course of the chain adjacent air nozzle 128 a blast from which separates the cages from the jigs to permit them to fall to chute 129 and into a hopper 130.

The structure of the cams aforementioned and their relationship to the several loading mechanisms referred to, will become clear from the following detailed description of the several mechanisms.

The first loading mechanism

The first loading mechanism 123 is adapted to load the first spacer plate 50 shown in Figure 1, on a jig 120 shown in Figure 5 and which is mounted on chain 94 for intermittent movement to a position adjacent the mechanism referred to for receiving the spacer plate aforementioned therefrom. The jig 120 is provided with mandrels 131, 132 and 133 which are appreciably shorter than the electrodes to be mounted for a purpose to be described. The three mandrels referred to are of appreciably smaller cross-section than the apertures 52, 54, 55 of the spacer plate into which they are adapted to extend when the plate is mounted. The mandrels referred to are therefore adapted to orient the spacer plate roughly only, on the jig. It will be noted further that the jig 120 is provided with recesses 134, 135, 136 having walls spaced from the mandrels aforementioned for a purpose to be described.

While the movements of the chain 94 are controlled as aforementioned to dispose the jig 120 in a position close to the loading mechanism 123, this position may not be sufficiently accurate to permit the mandrels 131, 132, 133 to enter the apertures 52, 54, 55 of the spacer plate 50. Therefore, there is provided as part of the first loading mechanism a supplementary locating and locking means for engaging the jig. This supplementary means is shown and described in full in the aforementioned copending application Serial No. 218,838, now patent 2,842,832. It is shown generally in Figure 8 herein, and includes a rod 137 fixed to two pins, one of which is shown at 138. The two pins referred to are tapered at their ends and are adapted to enter side apertures 139, 140 in the jig 120 as shown in Figure 5 for accurately locating and locking the jig. The rod 137 is resiliently connected to a plate 141 adapted to engage a side of jig 120, particularly when the fingers 138 are retracted from the jig, to prevent displacement of the jig by the retracting force. The rod 137 is connected to a lever 142 pivoted on table 86 at 143 and extending below the table to engage a cam 144 fixed to shaft 102. A spring 145 serves to urge the lever into following relation with respect to the cam referred to.

The first mounting mechanism referred to also includes a loading head 146 fixed to shaft 147 by bracket 148. The shaft 147 is mounted on bearings 149, 150 for rotation and vertical movements. Rotation of the shaft is effected by shaft 151, one end of which engages a side extension of a collar 152 fixed to shaft 147, and the other end of which engages a lever 153 having a follower 154 engaging cam 155. The magnitude of rotation is sufficient to cause the loading head 146 to be in successive vertical registry with a reservoir 156 of spacer plate 50 and with jig 120 as shown in Figure 9. Vertical movement of shaft 147 is provided by the action of lever 157, one end of which engages a collar 158 fixed to shaft 147, by yoke 159, and the other end of which engages cam 160. The lever 157 is pivoted at 161. To cause an engaged spacer plate to adhere to the loading head during a loading operation and to be dislodged therefrom at the end of the operation, a passageway 162 is provided from the free end of loading head 146 through a hollow portion 163 of shaft 147 and to conduit 164. Conduit 164 is connected to manifold 165 shown in Figure 30. One conduit 166 extends from manifold 165 to a vacuum source through valve 167. Another conduit 168 communicates with an air pressure source through valve 169. Valves 167, 169, are urged to closed position, by means not shown, and are opened by cams 170, 171 respectively, mounted on shaft 102 as shown in Figure 10, during predetermined portions of the cycle of rotation of shaft 102. This provides a vacuum condition within passageway 162, which also communicates with openings 172, 173, 174, 175 in the loading head 146, as shown in Figure 11. This vacuum condition serves to hold a spacer plate 50 in engagement with the surface 176 of the loading head during pick-up of a spacer plate from reservoir 156 and transport thereof to jig 120. This vacuum condition continues as long as the valve 167 is left open by cam 170. When the spacer plate has been loaded on jig 120, the vacuum valve 167 is closed and the air pressure valve 169 is opened to provide an air blast through the openings 172 to 175 of the loading head to separate a loaded spacer plate from the spacer engaging surface 176 of the loading head.

The spacer plate reservoir 156 may be an automatically operable type such as is described in Patent 2,855,737, of R. W. Green and J. A. Chase and assigned to the same assignee as the present application. It may include elevator means 177 and means for controlling the height of a stack of spacer plates, including a light source 178 and photoelectric cell 179.

To further control the movements of the loading head 146, there may be provided a lever 180 fixed to shaft 147 as shown in Figures 8 and 9. The lever 180 is adapted to engage a framework fixed to table 86 and including riser portions 181, 182 and a transverse portion 183. The riser portions 181, 182 determine the length of the angular moving of the loading head 146 from the reservoir 156 to the jig 120, and back. The transverse portion 183 provides a control of the maximum elevation of the loading head.

The loading head 146 may be provided with recesses 184, 185, 186 shown in Figure 11, for receiving the relatively short mandrels 131 to 133 of jig 120.

Operation of first loading mechanism

The operation of the first loading mechanism will be appreciated best from a consideration of the several cams shown in Figure 10, involved in its operation. The cams are shown in zero position with respect to the levers engaging them. Zero position with respect to the apparatus as a whole may be assumed to be the position established when a pin 100 is at the exit end of groove 104 of cam 101 shown in Figure 7. In this position the movable chain 94 and jigs 120 of the apparatus are at the end of an intermittent movement thereof and at the beginning of an interval during which they are held stationary. In this position a jig will be adjacent the first loading mechanism 123 for receiving a part therefrom. This stationary interval may include 240° of a cycle of rotation of shaft 102.

During rotation of shaft 102 through one cycle from the zero position aforementioned, the loading head 146 is first maintained in vertical registry with jig 120 by engagement of lever 153 with a raised portion of cam 155 extending from 0 to 100°. Thereafter, lever 153 engages a fall portion of cam 155 extending to 180° to swing loading head away from jig 120 and into vertical registry with spacer plate reservoir 156. This registry continues through the next 100° to 280° on the cam. Thereafter, a riser portion of the cam between 280° and 0° is engaged by lever 153 to cause the loading head with a spacer plate engaged thereby to swing back to vertical registry with the jig 120.

During this cycle of operation, lever 157 which controls vertical movements of the loading head, travels first from a raised portion of cam 160 at 0° to a lowered position thereof between 50° and 60°. This lowers the loading head 146 to the jig 120 for transfer of the spacer plate thereto. This transfer is accomplished during the 10° between 50° and 60°. Thereafter, the lever 157 engages a riser portion of the cam extending from 60° to 110°, to raise the loading head. The loading head is held in raised position by engagement of the lever 157 with the raised portion of the cam from 110° to 180°. Thereafter, the loading head is lowered into engagement with the reservoir 156, by engagement of the lever 157 with the fall portion of the cam extending from 180 to 210°. The lowered position is maintained through 20° of the cam to permit the loading head to engage a spacer plate. Thereafter, the loading head is raised by engagement of lever 157 with riser portion extending from 230° to 280°. It is held in this position by raised portion of the cam extending from 280° to 0°.

Also, during the aforementioned cycle, lever 142 actuating the locating and locking members 138, 141, first engages lower portion of cam 144 extending from 0° to 130° during which the locating and locking members engage the jig 120. Thereafter, the locating and locking members are released from the jig during engagement by lever 142 with riser portion from 130° to 180° of the cam and the release is maintained during the next portion of the cam from 180° to 290°. Thereafter, the members referred to are moved towards engagement with the jig by the cam fall portion 290° thereof to 340°.

At zero position referred to, cam 170 controlling the vacuum engagement by loading head 146 with spacer plate 50, holds vacuum valve 167 open, through the succeeding 45° of its movement. Thereafter, the valve is closed by engagement of the valve with a lower portion of the cam extending from 45° to 215°. During this time, spacer plate is loaded on jig 120 and the loading head 146 returns to reservoir 156 to pick up another spacer plate. After the new spacer plate is engaged, the vacuum valve is opened by raised portion of the cam extending from 215° to 0°. This causes the new spacer plate to adhere to the surface 176 of the loading head during the movement of the loading head to vertical registry with the jig 120.

Cam 171 controlling air pressure valve 169 engages the valve at a lowered portion thereof to keep the valve closed. Spaced 45° from the zero position is a riser portion extending from 45° to 60° which when engaged by the valve causes the valve to open. The open position is maintained from the 60° to the 80° portion of the cam. During this interval, air under pressure is directed to the openings 172 to 175 of the loading head to dislodge a spacer plate from engagement with the surface 176 thereof. Thereafter, the valve 169 is closed by engagement of cam fall portion from 80° to 95° with the valve, and the closed position is maintained by cam dwell portion from 95° to 0°.

*The second loading mechanism*

The second or grid loading mechanism 124 is adapted to load a wound grid 58 of the type shown in Figure 1. The grid loading mechanism includes a grid reservoir 187 supported on uprights 188, 189 fixed to table 86 as shown in Figures 12 and 14. The reservoir includes a casing 190 providing bearings for two spaced sprocket wheels 191, 192. An endless chain 193 engages the sprocket wheels aforementioned. Sprocket wheel 192 is actuated in a manner to be described to cause chain 193 to travel in the direction of the arrow shown in Figure 12.

Sprocket wheel 192 is fixed to a shaft 194 to which is also fixed a spur gear 195 as shown in Figure 13. Engaging spur gear 195 is an idling gear 196. Idling gear 196 is in turn engaged by a drive gear 197 fixed to a shaft 198. Also affixed to shaft 198 is a ratchet wheel 199. Suitably urged, as by spring 200, into engagement with ratchet wheel 199 is a pawl 201 pivoted on lever 202 which in turn is pivoted on shaft 198. The end of lever 202 remote from shaft 198 is engaged by one end of a shaft 203. The other end of the shaft 203 is connected to a lever 204 adjacent one end thereof. The lever is pivoted at its other end to the underside of table 86 at 205. The lever 204 at its other end includes a cam follower 206 which engages a cam 207 fixed to shaft 102. The cam follower 206 is urged into engagement with the cam by a spring 208.

Rotation of shaft 102 and cam 207 thereto affixed, causes the shaft to rise and fall in response to the cam contour. Such rise and fall of shaft 203 causes intermittent rotation of drive gear 197 which is transmitted through idling gear 196 to the spur gear 195 and the sprocket wheel 192 fixed thereto.

Supported on casing 190 is a hopper defined by side wall 209 and end walls 210, 211. The upper side of the casing serves as the bottom for the hopper referred to. The hopper is adapted to receive in vertically stacked relation a plurality of trays 212 having troughs 213 adapted to support grids of the type shown in Figure 1. It is preferred to leave a side of the hopper open to provide ready inspection and replacement of troughs therein. To prevent a stacked array of troughs 212 from toppling, it is preferred to dispose the casing 190 and the side wall 209 in slightly tilted position as shown in Figure 14. The lower portion of end wall 211 is cut away to permit a tray 212 to pass through said wall for a purpose to be described.

Affixed to chain 193 are fingers 214 spaced along the chain a distance equal to the length of a tray 212. The upper side of casing 190 is provided with a slot 215 shown in Figure 13, through which the fingers 214 are adapted to extend and engage succeeding trays. The fingers referred to follow the intermittent movement of the chain 193 and each finger serves to move the lowermost tray in the vertical stack to the right as viewed in Figure 12 and through the cut away portion referred to of hopper end wall 211.

During such intermittent movement of the lowermost tray, its troughs 213 are successively brought into registry with an opening 216 in the hopper side wall 209. Registering with the opening referred to is the entrance end of a chute 217. Adjacent the side of the lowermost tray remote from the chute 217 is a nozzle 218 served by air under pressure by conduit 219. Across conduit 219 which may also be connected to nozzle 128 shown in Figure 3, is a valve 220 shown in Figures 12 and 30 engaging a cam 221. During a selected portion of a cycle of intermittent movement of a tray 212, when a trough is in stationary registry with the chute 217, the valve 220 is opened by cam 221 to direct an air blast to a grid in the registering trough to urge the grid through the hopper wall opening 216 and into the entrance end of chute 217. An air blast is also directed through nozzle 128 to dislodge a completed cage from a jig.

To receive an empty tray carried intermittently through the cut away portion of hopper end wall 211, a track is provided by an extension of casing 190 to the right from the hopper as viewed in Figure 12. The upper wall of the casing 190 is cut away to permit arms 222, 223 to lie flush with the upper casing wall. The arms referred to are fixed at one end thereof to a shaft 224 shown in Figures 13 and 17. Shaft 224 is mounted for rotation in bearings 225, 226. Fixed to shaft 224 is a lever 227 (Figure 17) which is pivotally connected to a piston 228 movable in a cylinder 229. The piston 228 is actuated successively in opposite directions by air under pressure fed to cylinder 229 by ducts 230, 231. The ducts 230, 231 are selectively connected to a conduit 232 by a solenoid valve 233. Conduit 232 is connected to a source of air under pressure as shown in Figure 30.

At the extreme right of the track provided by the upper surface of casing 190, as viewed in Figure 13, is a switch 234. Switch 234 is normally open, so that solenoid valve 233 provides communication between conduit 232 and duct 230, which keeps the arms 222, 223 in horizontal position. However, when an empty tray is impelled to the end of the track, the switch 234 is closed, actuating solenoid 462 to connect the air pressure source with duct 231, thereby causing the piston 228 to move to the left as viewed in Figure 17. This causes lever 227 to rotate shaft 224 and arms 222, 223 to the right through an arc of 90° as viewed in Figures 14 and 17. This movement of the arms referred to carries with it the empty tray aforementioned, and deposits this tray on its side and moves it through opening 235 and onto a platform 236. As shown in Figure 14, platform 236 has an area for supporting a plurality of trays in this manner, thereby reducing operator attention in respect of removal of empty trays.

It is preferred to support grids 58 in the grid reservoir 187 in horizontal or substantially horizontal position as shown, in view of their relatively fragile structures. The substantially horizontal disposition of the grids provides full support therefor during the movement of a tray to fully register a grid with the entrance end of chute 217. Each grid is subjected to individual movement by the air blast from nozzle 218, only after the full registry aforementioned is completed.

Since it is most convenient to assemble the several electrodes in vertical positions on a mounting jig 120, it becomes necessary to rotate a grid 58 through an angle of substantially 90°, during its transit from a tray 212, wherein it is positioned substantially horizontally, to a mounting jig 120 on which it is disposed vertically. To accomplish such rotation, the chute 217 is provided with an arcuate portion extending from its substantially horizontal entrance portion shown in Figure 13 to its substantially vertical exit portion 237 shown in Figure 14.

The angular travel of a grid 58 through the arcuate chute aforementioned imposes a substantial frictional restraint thereon. This restraint is of such magnitude as to substantially stop or at least appreciably reduce the velocity of a grid in the chute as it approaches the exit portion 237 thereof. An increase in the impelling force directed to the grid by air nozzle 218 to overcome such restraint, is not feasible because of the fragile construction of the grid. For example, an increased force may distort the relatively fine wire grid turns 61 to the point where the grid is unsuitable for use in an electron tube.

The absence of appreciable velocity of the grid at the exit portion 237 of the grid chute is particularly objectionable since the leading ends of the grid side rods 59, 60, are required to enter apertures 51, 53 in the previously mounted spacer plate 50, which apertures are of reduced size for snugly receiving the side rod ends referred to.

According to the invention, means are provided for impelling the grid adjacent the exit portion 237 of the chute with sufficient force and without damaging the grid, to cause the grid to continue its travel to jig 120 and to cause the leading ends of the side rods thereof to be forcefully inserted into the apertures 51, 53 of the previously loaded spacer plate.

This means may comprises a structure including a finger 238 shown in Figure 16 pivotally mounted on a collar 239 fixed to a shaft 240. The pivotal mounting of the finger 238 permits it to respond in rotation on pin 241. Such rotation in a counterclockwise direction occurs on raising shaft 240, in response to the engagement of wheel 242 mounted on the finger, by a beveled surface 243 on a projection 244 extending from the exit portion 237 of the chute. This rotation is effected against the force of a spring 245 connected to the free end of lever portion 246 of the finger and to the collar 239. To enable the chute to absorb harmlessly the resultant thrusts thereon, the exit portion 237 thereof is supported by a cross arm 247 fixed to upright 189. A lowering of shaft 240 releases the engagement between wheel 242 and the bevelled surface 243, and the finger 238 is free to rotate in a clockwise direction in response to the force of spring 245 thereon.

Rotation of finger 238 in a counterclockwise direction results in its deflection laterally from chute exit portion 237. Rotation in a clockwise direction causes the free end of the finger to enter the chute exit portion 237 and into the path of travel of a grid 58, therein.

To permit the shaft 240 to be raised and lowered, it is mounted in bearing 248, shown in Figure 12, for vertical movement. To cause vertical movement of shaft 240, its lower portion has affixed thereto a doubly flanged collar 249 engaging one end of a lever 250. The lever 250 is pivoted at 251 on a bracket 252 fixed to shelf 89 of the apparatus. The other end of the lever is disposed in cam following relation with respect to a cam 253 fixed to shaft 102. A riser portion of cam 253 causes the lever 250 to raise shaft 240, and a succeeding fall portion of the cam permits the shaft to be lowered by the action of a compressed spring 254 bearing against a collar 255 fixed to shaft 240 and against the underside of table 86.

As shown in Figure 18, the lowered portion of cam 253, extending from 100° to 110° is appreciably closer to the shaft 102 than the raised portion thereof extending from 170° to 40°. This appreciable difference in the spacing of the two cam surfaces referred to from shaft 102, not only permits the finger to enter the chute exit portion 237, but also causes the finger to move downwardly after such entrance. The entrance of the finger into the chute as aforementioned and into the path traversed by a grid 58 therein, disposes its free end surface 256 above a grid that may have been partly or fully ejected by the chute. The further downward movement imparted to the finger causes its free end surface 256 to engage the trailing ends only, of the side rods of the grid, for impelling the grid into a forced engagement with apertures 51 and 53 of the first loaded spaced plate. To assure that the end 256 of the fingers engage only the grid side rods, the end referred to is dimensioned to extend across the two side rods and is provided with a tongue portion shown in Figure 16 adapted to extend between the grid side rods without contacting the grid turns of the grid. Sloping surfaces are provided between opposite sides of the tongue aforementioned and adjacent surfaces of end 256 to facilitate engagement between said adjacent end surfaces and the trailing ends of the grid side rods referred to.

After a grid has thus been pushed into mounted position by the push-down finger 238, the shaft is raised and the finger is deflected out of chute portion 237 to permit a succeeding grid to travel to a position for repetition of the push-down action of the finger.

In view of the appreciable force exerted on a grid by the push-down finger 238, as aforementioned, it is necessary that the previously mounted spacer plate 50 be accurately positioned on the jig 120 adjacent the grid loading mechanism, and that the grid be properly guided to the plate during its transit from the exit end portion 237 of the chute to engagement with the plate referred to. This is particularly important, since a forced engagement between the grid and an improperly located plate may result in a buckling or other distortion of the grid. Furthermore, a grid improperly guided after leaving the travel control of the chute, will result in a faulty mounting even though the first loaded spacer plate should be properly located.

Therefore, according to the invention, means are provided for accurately locating the first loaded spacer plate and for guiding a grid from the exit end portion 237 of the chute to the accurately located spacer plate. This means may comprise a slide structure shown in Figure 15 and including oppositely disposed slide members 257, 258. Each slide member includes a bottom plate 259, an intermediate plate 260 and a top plate 261 having an upwardly extending guide member 262. Guide members 262 and 263 have facing surfaces curved to provide complementary grooves 264, 265 defining a funnel. The plates 259, 260 and 261 of member 257 are fixed to each other for unitary movement. The analogous plates of slide member 258 are fixed to each other in like manner. Member 257 is mounted on a plate 266 shown in Figure 12. Member 258 is mounted on a movable part of locating and locking member 267 described in more detail in the aforementioned copending application Serial No. 218,838. Plate 266 is slidable on fixed member 268. A slot 269 is provided in plate 266 for receiving one end of a lever 270 pivoted at 271 on a bracket 272. The other end of lever 270 is connected to one end of a rod 273. The other end of rod 273 is connected to a lever 274 adjacent one end thereof. Also connected to the lever 274 adjacent the end referred to, is a rod 275 actuating the locating and locking member 267 and the slide member 258 thereon mounted. Lever 274 is pivoted on pin 276 mounted on a bracket 277 fixed to table 86. The other end of lever 274 extends below table 86 and engages a cam 278 fixed to shaft 102. Lever 274 is caused to rotate in one direction by its engagement with cam 278 to separate the slide members 257 and 258 and release jig 120 from engagement by the locating and locking member 267. Spring 279 engaging lever 274 serves to urge the slide members referred to toward each other and to locate and lock the jig when the lever 274 engages a fall portion of cam 278, and is rotated in the opposite direction.

As shown in Figure 15, plate 259 is provided with a tongue 280 which is adapted to enter side indentation 56 of the spacer plate 50 shown in Figure 1. The sides of the tongue are beveled to conform to the beveled sides of the indentation 56. If the spacer plate is improperly spaced in the direction of its longitudinal dimension from an accurate location in this direction, the engagement of beveled tongue 280 with the beveled sided indentation 56 on the spacer plate, will move the spacer plate to the accurate location referred to. Adjacent ends of plate 259 and its counterpart 281 also engage side edges of the spacer plate spaced from the indentations 56, 57 therein. This orients the spacer plate in an accurate location normally to the aforementioned direction. The spacer plate is therefore accurately located in a predetermined position by the action thereon of plates 259, 281.

The plates 260, 261 and plates 282, 283 are critically fixed to plates 259 and 281 respectively so that the upright guides 262, 263 and plates 260, 282 form a guiding funnel having side walls merging with edges of apertures 51, 53 shown in Figure 1, in spacer plate 50. A grid 58 following said side walls will have the leading ends of its side rods accurately directed to the apertures referred to. The uprights 262, 263 are relatively rugged for directing a forcefully impelled grid to the apertures mentioned.

It will be noted from the foregoing that the locating and locking member 267 locates and locks the jig 120 in a predetermined accurate position, and the slide members 257, 258 engage and locate the previously loaded spacer plate 50 in a predetermined accurate position on the jig for receipt of a grid. While the jig itself is located accurately by the member 267, this may not always also accurately locate the spacer plate 50 thereon.

This is for the reason that the mandrels 131, 132, 133 of the jig shown in Figure 5, are of appreciably smaller cross section than the spacer apertures 52, 54, 55 shown in Figure 1, which they are adapted to enter. The relatively thin mandrels are required for a reason that will become apparent in the following. Therefore, the supplementary locating function of slide members 257, 258 is required.

*Operation of the second loading mechanism*

A consideration of the action of cams 207, 221, 253 and 278 associated with the second or grid loading mechanism and shown in Figure 18, will contribute to an understanding of the operation of this mechanism.

A rotation of cam 207 through 360° will successively dispose cam follower 206 in engagement with lower surface from 0° to 10°, and riser portion from 10° to 40°. Engagement with the riser portion referred to will cause the rod 203 to rise permitting the pawl 201 to idle over the ratchet wheel 199. Engagement of the cam follower with the raised dwell from 40° to 240° serves to hold the rod and pawl referred to, stationary. When the cam follower 206 engages the fall portion of the cam from 240° to 340°, the rod 203 is lowered causing the pawl 201 to engage ratchet wheel 199 and rotate the same. A dwell is provided between 340° and 10° which when engaged by the cam follower 206, holds the rod stationary in position in response to the pull by spring 208. From 10° to 40°, a rise in cam 207 is provided followed by an upper dwell from 40° to 240°. The actuating of pawl 201 in a downward direction, as aforementioned, causes rotation of spur gear 197, idling gear 196 and spur gear 195. Since spur gear 195 is fixed to the same shaft as sprocket wheel 192, rotation is also imparted to the sprocket wheel mentioned causing movement of chain 193, the upper course traveling in the direction of the arrow shown in Figure 12, a distance equal to that separating adjacent troughs 213 of trays 212. Prior to the movement referred to, one of the troughs 213 was in registry with the opening 216 in the hopper side wall 209 and with the entrance end of chute 217. The movement referred to of the chain 193 causes a finger 214 thereof to move the lowermost tray to the right (Figure 12) until an adjacent trough thereof is in registry with the opening and chute referred to. The lowermost tray is left in this position until the shaft 102 has rotated through an arc 200°, from the 40° position to the 240° location on cam 207 at the end of which a succeeding movement of the tray occurs.

Referring now to cam 221 actuating valve 220 to cause an air blast to be directed by nozzle 218 to the grid in the trough in registry with chute 217, it will be noted this cam has a portion rising at 340° and having a raised dwell from 355° to 15°. It will be noted the raised dwell is engaged by valve 220 after a movement of a tray 212 has stopped, and a grid is in registry with the chute 217. When such engagement occurs between cam 221 and the valve, the valve is opened and an air jet is directed to the grid referred to causing it to enter the chute. Engagement of valve 220 with the lower dwell on cam 221 from 31° to 340° keeps the valve closed.

After the closure of valve 220 and the impelling of a grid through chute 217, cam 253 lowers shaft 240, during engagement by lever 250 of the cam portion from 40° to 100°. This causes the finger 238, shown in Figure 16 to enter chute end portion 237 and engage and push down the grid previously impelled, onto jig 120 and with the side rods of the jig forced into apertures 51, 53 of the previously loaded spacer plate.

Before cam 253 actuates the push-down finger 238, cam 278 has engaged lever 274 through a fall portion thereof extending from 200° to 340° to cause the locating and locking member 267 to engage the jig 120 and to cause the slide members 257, 258, to move towards each other to provide a funnel accurately leading to the apertures 51, 53 to be entered by the side rods of the aforementioned grid. Therefore, when the grid is pushed down into engagement with the previously loaded spacer plate, the plate is accurately located on the jig and a funnel or guide is provided to guide the grid accurately to the spacer plate.

When all the troughs in the lowermost tray have been placed in successive registry with the chute 217 and the grids contained in the troughs have been impelled into the chute, the tray trips switch 234 to cause the arms 222, 223 on which the empty tray rests, to rotate, thereby moving the empty tray to a horizontally disposed stack on platform or shelf 236. Travel of the lowermost tray to the position where it trips switch 234, causes its trailing end to pass through the cut-away opening below hopper end wall 211. This permits the next higher tray to drop to the position vacated by the empty tray for a repetition of the aforegoing cycle.

The hopper aforementioned is adapted to receive a relatively large number of trays in vertically stacked relation. This permits a relatively large number of grids to be dispensed by the hopper before replacement of full trays is required. An economy in operator attention is thus provided.

The third loading mechanism

The third or cathode loading mechanism 125 shown in Figures 19 and 20 includes a hopper 283, a drum type dispenser 284 rotatable in the hopper and having peripheral grooves 285 adapted to carry cathode sleeves 63 to a chute 286 having an exit end or opening 287 in vertical registry with a jig 120 moved into position below the hopper. The drum 284 is rotated intermittently by a pawl and ratchet combination actuated by a rod 288. The hopper, drum, and pawl and ratchet combination are shown and described in the copending application Serial No. 279,804 now Patent No. 2,760,254 aforementioned.

The rod 288 is connected to an end of a lever 289 pivoted at 290 on a bracket 291 fixed to shelf 89. The other end of lever 289 engages a cam 292 fixed to shaft 102. A spring 293 fixed to the underside of table 86 and to lever 289 adjacent its other end referred to, serves to keep the lever in engagement with cam 292 and to provide a force for lowering the rod 288, the force for raising the rod being provided by the cam referred to. Rotation of cam 292 causes the rod 288 to successively rise and fall to release a cathode from the drum 284 and into the chute 286.

A cathode sleeve falling from the exit end 287 of the chute 286 must enter the tubular structure 62 defined by grid turns 61 shown in Figure 1, of the previously loaded grid 58, and the aperture 52 in the earlier loaded spacer plate 50. As described in connection with the second loading mechanism, the grid 58 is loaded in such manner that it enters suitable apertures in the spacer plate 50. During the loading operation, the grid is suitably guided and supported in a desired vertical position. However, during transit from the grid loading mechanism to the cathode loading mechanism, the grid is unsupported except by its engagement with the spacer plate in the manner mentioned. Since this engagement is relatively weak, there is danger that the grid may have moved from its initially fixed position, during the transit aforementioned. It will be appreciated that when the grid 58 is relatively small, or has opposite portions of grid turns 61 in relatively close space relation, a critically vertical position of the grid is required with the tubular structure 62 thereof in coaxial relation with the exit end of cathode chute 286, for a satisfactory loading of a cathode sleeve.

According to the invention, means for accurately locating a grid at the cathode loading mechanism are provided, in combination with means for locating and locking a jig 120 in a predetermined position adjacent the aforementioned mechanism. The jig locating and locking mechanism is similar to that shown in connection with the aforedescribed first and second loading mechanisms. It includes a plate 294 spring urged against jig 120 and two pins, one of which is shown at 295, movable into openings 139, 140 of the jig, shown in Figure 5. The pins or fingers referred to are connected to a rod 296, shown in Figure 19. The free end of rod 296 is connected to an end of a lever 297 pivoted at 298 and having another end engaging a cam 299. A spring 300 urges the lever into cam following engagement with cam 299. Rotation of cam 299 causes the plate 294 and fingers 295 to successively engage and be disengaged from jig 120.

The locating means for the grid comprises slide members 301, 302. Slide member 301 is fixed to slide plate 303 having a slot 304 for receiving one end of a lever 305. Lever 305 is pivoted on bracket 306 and its other end is engaged by a rod 307. Rod 307 is connected to lever 297 adjacent the end thereof engaging rod 296. A spring 308 connected to slide plate 303 and bracket 306 urges the slide plate referred to into engagement with the lever 305. Slide member 302 is mounted on the jig locating and locking member for movement with the finger 295 thereof.

The slide member 301 includes a plate 309 having an upright portion 310. This portion is provided with a longitudinal recess 314 for engaging one side, including a grid side rod 59, of a grid 58. Member 302 also includes a plate 312, having upright portion 313 provided with a longitudinal recess 311 facing recess 314 in upright 310. Recess 311 is adapted to engage the opposite side of grid 58 including side rod 60.

Affixed to upright portion 310 is a guide member 315 having a groove 316 thereon. Affixed to upright portion 313 is a guide member 317 also having a groove 318 thereon. The grooves 316 and 318 face each other and are adapted to form a funnel or path coaxial with the tubular structure of grid 58, with aperture 52 shown in Figure 1, and with the exit end 287 of chute 286. This coaxial disposition of the path defined by the grooves 316, 318 occurs when the upright portions 310, 312 engage opposite sides of the grid, as shown in Figure 20.

Operation of the third loading mechanism

The operation of the third or cathode loading mechanism will best be appreciated by a consideration of the actions of cams 292 and 299. At zero portion of cam 299, movement of jig locating and locking members 294, 295 into engagement with jig 120 has just been completed. The engagement continues until the 140° location on the cam is engaged by lever 297. A riser portion on the cam follows, extending from 140° to 190° which when engaged by the lever aforementioned causes the locating and locking members to be disengaged from the jig. A raised dwell portion on cam 299 extending from 190° to 300° maintains the disengagement referred to. A fall portion from 300° to 350° on the cam causes a succeeding engagement between the jig and the locating and locking members.

The mounting of grid locating and cathode guide member 302 for movement with fingers 295 of the jig locating and locking mechanism, causes the locating and guide member 302 to travel with the fingers 295 to appropriate locating and guiding position. The action of lever 305 on slide plate 303 also causes the grid locating and cathode guide member 301 to move into a predetermined locating and guide position. Both members 301 and 302 are in the positions aforementioned when the jig 120 is located and locked by plate 294 and fingers 295 in response to engagement by lever 297 of the lower dwell portion of cam 299 extending from the 350° portion thereof to the 140° portion.

It will be noted that after the lever 297 engages the lower dwell of cam 299, the lever 289 engages an undulating portion of cam 292 extending from 310° to 90°, At zero position on the cam, a slight rise begins that serves to jostle the cathode drum 284 to release a cathode into chute 286. A cathode is therefore released after the jig has been located and locked in a predetermined position, and the grid locating and cathode guiding members 301 and 302 engage the previously loaded grid and provide a funnel for guiding the released cathode into the tubular structure defined by the grid and to the mandrel 132 extending from aperture 52 of the previously loaded spacer plate. It will be noted in this connection that when the grid is properly located by the members 301, 302, proper location of mandrel 132 and the aperture 52 of the spacer plate automatically follows, in view of the snug engagement of the side rods of the grid in apertures 51, 53 of the spacer plate.

In view of the resulting accurate alignment of aperture 52 with the guiding funnel defined by recesses 316, 318, provided by the locating and guiding members 301, 302, entrance of the leading end of released cathode into aperture 52 is facilitated, even though the cathode fits snugly in the aperture. To further facilitate entrance of the cathode into aperture 52, the cathode may be provided with a tapered leading end.

The fourth loading mechanism

The fourth or anode loading mechanism 126 is adapted to load an anode 67 of the type shown in Figure 1. One form of this mechanism is illustrated in Figures 21, 22, 23 and 24. Certain features of this mechanism including a vibrating reservoir 319 and chute 320 are shown and described in copending application Serial No. 218,838 aforementioned. The chute has a longitudinally extending slot 321 through which a side portion 322 of an anode 67 is adapted to extend outwardly of the chute. The slot 321 is sufficiently narrow to prevent the side wings 68, 69 of the anode from passing therethrough.

The chute 320 is provided with an aperture 323 opposite the slot 321 for providing light communication through the chute in the absence of an anode therein. This light communication results in energization of a photoelectric relay 324 by a light source 325 aligned with the aperture 323. Such energization serves to start vibration of the vibrating reservoir 319 to replenish the supply of anodes in chute 320. It should be noted in this connection that when relay 324 is shielded from light source 325, caused by a full condition of chute 320, the power circuit causing vibration of the reservoir 319 is opened, and the vibration stops. This arrangement therefore assures that the relatively rapid rate of supply of anodes by the reservoir to the chute, does not jam anodes as they enter the chute, by providing an effective control of this rate.

Affixed to chute 320 below the aperture 323, is an anode feed control mechanism including a T-shaped structure comprising an arm 326 and a transverse member 327 pivoted on a pin 328 fixed to chute 320. The free end of arm 326 is engaged by piston rod 329 actuated by a solenoid 330. As shown in Figure 22, the transverse member 327 is provided with raised surfaces 331, 332 adapted to engage successively levers 333 and 334 respectively. The levers referred to are pivoted at one end on a pin 335 extending through a block 336 fixed to chute 320. Extending through lever 333 is a screw 337 having one end threaded into block 336. A spring 338 bears against a head 339 on the screw and against the lever 333 urging the lever against the block referred to. The lever aforementioned extends across slot 321 and into the path of movement of the transverse member 327 for engagement with the raised portion 331 thereof. Affixed to a portion of the lever opposite slot 321 is a pin 340. When the raised portion 331 of the member 327 engages lever 333 in response to rotation imparted thereto by the solenoid piston 329 in a counter-clockwise direction as viewed in Figure 22, the lever 333 is moved away from block 336 against the tension of spring 338. This causes the pin 340 to move out of slot 321 to permit an anode 67 to pass the pin. At the same time, raised portion 332 is moved away from lever 334, permitting this lever to move towards the block 336 in response to the force of a spring 341 thereon. This causes a pin 342 fixed to lever 334 to enter the slot 321 and bar travel of an anode in the chute. A screw 343 having a head 344 is similar in structure and function to screw 337 and head 339 aforementioned.

When the transverse member 327 is rotated in a clockwise direction by retraction of solenoid piston 329, lever 333 is released permitting pin 340 to enter slot 321 and frictionally engage the side of an anode in the chute. At the same time, lever 334 is moved away from block 336 by the engagement therewith of raised portion 332 of the member 327. This causes pin 342 to leave the slot 321, thereby removing restraint to a fall of the anode previously engaged by this pin.

The solenoid 330 may be of a type that transmits movement to piston 329 in one direction only, say an upward direction. Then spring 345 will serve to move piston 329 in a downward direction. The levers 333 and 334 are spaced along the chute 320 to provide for engagement of adjacent anodes by the pins 340 and 342, to assure a one by one feed of anodes by the chute.

The anode feed control mechanism described, functions to release an anode for free fall to the exit end of the chute, only after a jig 120, with a previously mounted spacer plate, grid and cathode thereon, is moved into parts-receiving position adjacent the anode loading mechanism.

During movement of the jig referred to towards parts-receiving position at the anode loading mechanism, the aforementioned actuation of solenoid 330 to release an anode takes place in response to the closing of normally open switch 346 by cam 347, as shown in Figures 21 and 24. Engagement of raised dwell between 310° and 330° on cam 347 by switch 346 maintains the switch closed sufficiently long to release an anode.

After chain 94 of the apparatus has stopped, a jig spaced from the anode loading mechanism in the direction of movement of the chain and having an anode previously loaded thereon is in position so that the anode thereon is aligned with the light source 348 and photoelectric relay 349. The photoelectric relay 349 is disposed across a circuit normally closed and which when open serves to stop the motor connected to shaft 102. The anode in position on the jig mentioned shields the relay 349 from the light source 348. During a portion of the time that the jig is in the position aforementioned, the raised dwell portion of cam 350 from 0° to 50° serves to keep the normally closed switch 351 open. Therefore, if an anode is absent from the jig in question, both switch 351 and relay 349 will be open causing a stoppage of the apparatus.

After a jig 120 is stationary at the anode loading mechanism, a jig locating and locking mechanism, similar to that described in connection with the foregoing loading mechanisms, is actuated by a cam 352 to properly locate and lock the jig in a desired position. This mechanism, as shown in Figure 21, includes a plate 353 adapted to resiliently engage a side of jig 120, and two tapered fingers, one of which is shown at 354, for entering openings 139, 140 in a side of the jig. The fingers 354 are connected to a rod 355 in turn connected to one end of a lever 356. The lever 356 extends below table 86 and engages cam 352. A spring 357 serves to keep the lever 356 in engagement with cam 352.

While movements of lever 356 actuate the jig locating and locking mechanism into and out of engagement with a jig, it also serves to actuate a guide structure comprising slide members 358, 359 shown in Figure 23. Slide member 358 includes a lower plate 360 and an upper plate 361 fixed to the lower plate and having an upwardly extending guide portion 362. This guide portion is provided with a recess 363 adapted to engage snugly a side portion of an anode. The recess is flared at 364 for facilitating receipt of an anode. The slide member 359 includes elements complementary to the elements of slide member 358 referred to. These elements comprise a lower plate 365 and an upper plate 366 having an upwardly extending guide portion 367. This guide portion is provided with a recess similar to recess 363 and a flared portion 368. The recesses referred to are in facing relation to engage opposite sides of an anode 67.

The slide member 359 is mounted on the jig locating and locking mechanism aforementioned for synchronous movement with the fingers 354 thereof. The slide member 358 is mounted on a slide plate 369 shown in Figure 21 and having a slot 370 for receiving one end of a lever 371. The lever 371 is pivoted on a pin 372 fixed to a bracket 373. The other end of lever 371 is connected to a rod 374 which in turn is connected to lever 356 adjacent rod 355. A spring 375 serves to urge the aforementioned one end of lever 371 against a side wall of slot 370, to prevent backlash.

It will be noted from Figure 23 that a spacer plate 50 has been loaded previously on the jig. A grid and cathode have also been previously loaded but are omitted from the figure in the interests of clarity. To enable the lower slide members 360, 365 to engage the upper face of spacer plate 50, and dispose edges close to anode receiving apertures 54, 55, one of which only is shown in Figure 23, the lower surfaces of the members referred to are cut away as shown at 376, 377. To facilitate guidance of an anode into apertures 54, 55, the facing edges of lower slide members 360, 365 are beveled as shown at 378.

As will be observed in Figure 21, the anode falls a relatively short distance from the release member 327 to the jig 120. The force of the fall is therefore inadequate to cause full entrance of anode ears 76, shown in Figure 1, into the spacer plate slots 54, 55. This is particularly so since an appreciable force is required to cause the lower ear projections or dimples 85, shown in Figure 1, to snap through the apertures. Therefore, a supplementary push-down means is provided at the anode loading station, for forcefully pushing down an anode partly seated between the guide members 362, 367 shown in Figure 23.

The push-down means referred to includes fingers 379, 380 fixedly mounted on an arm 381 in turn fixed to a shaft 382 that is free to rotate. The arm 381 is urged by a spring 383 to cause the fingers to extend into a cut away end portion 320a of chute 320 and into the path traversed by an anode in falling into the position thereof shown in Figure 23. A member, not shown, having an inclined surface similar to that of surface 243 shown in Figure 16 in connection with the grid loading mechanism, engages arm 381 to deflect it backwards, as viewed in Figure 21, in response to a raising of shaft 382. When the shaft is lowered, the inclined surface referred to permits the arm to swing in a forward direction in response to the force of spring 383, to cause the fingers 379, 380 to swing into the chute end portion. The magnitude of the downward movement of shaft 382 is adequate not only to actuate the fingers as aforementioned, but also to move the fingers downwardly at the conclusion of an inward swing, to cause them to engage the upper end of an anode partly seated as described before, and to push the anode downwardly until its lower ears are fully engaged by apertures 54, 55 in the loaded spacer plate.

To provide the required vertical and rotary movements of shaft 382 to cause the fingers to successively move into the chute, push down an anode, and move out of the chute, a bearing 384 is provided to allow longitudinal and rotary movements of the shaft. A compression spring 385 is mounted between the underside of table 86 and a collar 386 fixed to shaft 382 for urging the shaft downwardly. A double flanged collar 387 engages one end of a lever 388. The lever is pivoted on pin 389 fixed to a bracket 390 fixed to shelf 89. The other end of lever 388 engages a cam 391 having a contour for imparting the required vertical movements to shaft 382.

*Operation of the fourth loading mechanism*

The jig 120 previously loaded with a spacer plate 50, a grid 58 and a cathode 63, is brought into vertical registry with the lower end of chute 320 when the cams are in zero position as shown in Figure 24. Slightly prior to the arrival of the jig into this position, cam 347 closes a switch, thus energizing solenoid 330 to release an anode 67. During fall of the anode, the jig moves to its aforementioned stationary position. The sequence of jig stoppage and anode fall to the jig is such as to assure a stationary position of the jig when the anode falls into engagement therewith.

Thereafter, cam 350 opens normally closed switch 351 to permit the photoelectric relay 349 to take over a control function with respect to energization of the mounting apparatus as a whole. Thus, in response to energization by light source 348 in the absence of an anode on a jig previously positioned at the anode loading mechanism, photoelectric relay 349 is opened. Opening of both the switch 351 and the photoelectric relay, causes an interruption in the current supplying power to the motor actuating the apparatus, with consequent stoppage of the apparatus. It is assumed in the present situation that an anode has been properly loaded on the previous jig and that therefore light energization of the relay 349 does not take place and that the energizing circuit aforementioned is closed.

Cam 352 controlling the operation of the jig locating and locking mechanism and the anode guide has a fall portion from the 290° to the 340° locations thereon. When lever 356 engages this fall portion, the jig locating and locking mechanism is operated to cause the fingers 354 to enter openings referred to in a side of the jig. At the same time, the slide members 358, 359 move towards each other to define an anode guiding structure shown in Figure 23.

Appreciably after the formation of the anode guiding structure as aforementioned, fall portion of cam 391 extending from the 40° mark to the 100° position engages lever 388, causing the shaft 382 to move downwardly in response to the force of spring 385. At the same time, the shaft 382 and arm 381 thereon are rotated in a clockwise direction as viewed from the top in Figure 21, in response to the force of spring 383 on the arm, to cause the fingers 379, 380 to enter chute 320 at a portion thereof above an anode initially seated between guides 362, 367, and to move downwardly in the chute to engage the upper end of the seated anode and to push the anode downwardly to cause the lower ears thereof with their locking dimples to snap through the apertures 54, 55 in the previously loaded spacer plate.

After the anode is pushed into the aforementioned engagement with apertures in the spacer plate, lever 388 is engaged by riser portion of the cam 391 extending from 110° to 170°, as a consequence of which shaft 382 is raised and arm 381 including fingers 379, 380 are swung in a counterclockwise direction as viewed from the top of Figure 21, by engagement of the arm with the inclined surface aforementioned. This causes the fingers referred to, to move out of chute 320, to clear the path therein for a succeeding anode.

During the aforementioned recession of fingers 379, 380 from chute 320, lever 356 engages the riser portion from 130° to 180° on cam 352, to cause the fingers 354 and plate 353 to become disengaged from jig 120 and to cause the anode guiding slides 358, 359 to move away from each other to release the anode just mounted.

The jig is therefore free to move to a succeeding position. However, during such movement, the prior jig previously loaded moves out of alignment with the light source 348 and the photoelectric relay 349 resulting in an opening of this relay. To prevent a stoppage of the apparatus in response to such opening, switch 351 is closed by engagement with the lower dwell from 60° to 350° on cam 350, thus closing the circuit opened by relay 349.

*The fifth loading mechanism*

The fifth or second spacer plate loading mechanism 127 is adapted to load the top spacer plate 77 shown in Figure 1. The fifth loading mechanism depicted in Figure 25 is similar in many respects to the first loading mechanism for loading the bottom spacer plate 50, as shown in Figures 8 and 9. Thus, the mechanism as shown in Figure 25 includes a rotatable and vertically movable shaft 392 mounted in a bearing 393 fixed to the underside of shelf 89. The shaft is hollow, thus, providing a passageway 394 communicating by means of an aperture 395 with a conduit 396. The passageway referred to extends through an arm supporting a loading head 397 and terminates in openings 398 in the parts-receiving surface 399 of the loading head. Conduit 396 is connected to a manifold 400 shown in Figure 30, to permit successive comunication of the conduit with a vacuum source and a source of air under high pressure. The communication with the vacuum source is provided by means of a valve 401 controlled by a cam 402 as shown in Figure 29. Communication of conduit 396 with the air pressure source is effected by valve 403 controlled by a cam 404 as shown in Figures 29 and 30. This successively provides a vacum condition in openings 398 in the loading head 397 for retaining a spacer plate 77 in engagement with the surface 399 of the head during transit of a plate in a loading operation, and an air blast from said openings to release the spacer plate after loading thereof.

The loading head 397 differs from the loading head forming part of the first loading mechanism, in that the former is provided with relatively short tapered mandrels 405, 406, 407. Mandrels 405 and 407 are adapted to enter the tubular passageways 72, 73 in the upper ears of a previously loaded anode, for centering said ears with respect to apertures 81, 82 in the spacer plate 77 carried by the head and shown in Figure 1. Mandrel 406 is adapted to enter the upper end of the previously loaded cathode 63 for centering this end with aperture 79 of the spacer plate.

Means similar to that shown in Figure 8 are provided for rotating the shaft 392 to dispose the loading head 397 successively in vertical registry with a reservoir of spacer plates, not shown, but similar to reservoir 156 shown in Figure 9, and with jig 120 when the jig assumes a predetermined stationary position adjacent the fifth loading mechanism under consideration.

This means comprises a rod 408 connected at one end to an arm 409 fixed to shaft 392 and at the other end to one end of a lever 410. The other end of lever 410 is pivoted to the underside of table 86 at 411. A cam follower 412 fixed to lever 410 engages a groove in a cam 413, as shown in Figure 29. The groove has a contour for imparting thrusts and pulls on rod 408 to swing arm 409 and rotate shaft 392.

Means are also provided for successively raising shaft 392 to elevate the loading head 397 during its transits between the spacer plate reservoir referred to above, and the jig 120, and to successively lower the head to permit a pickup of a spacer plate from the reservoir and to load the spacer on the jig.

This means may comprise a lever 414 pivoted on shelf 89 at 415 and engaging at one end thereof a double flanged collar 416 fixed to shaft 392. The engagement is accomplished by means of a yoke 417 provided at said one end of the lever. The other end of lever 414 engages a cam 418 having a contour for lowering and raising the loading head 397, as aforementioned, and to sharply push down a spacer plate 77 being loaded to cause the upper ears 74, 75 of the previously loaded anode and their locking embossments 85 to snap through apertures 81, 82 in the plate, and to force the lower end of the cathode 63 fully into the aperture 52 in the lower spacer plate 50 and the upper end thereof into the aperture 79 of the upper spacer plate 77 to cause the annular embossments 64, 65 on the cathode to abut against the inner surfaces of the spacer plates referred to.

The fifth loading mechanism also includes means for locating and locking the jig in desired position for a loading of spacer 77 thereon in the manner aforementioned. This means is similar to that employed in the first loading mechanism shown in Figure 8. This means may comprise a plate 419 resiliently mounted on a rod 420 and adapted to engage a side of jig 120, and two fingers, one of which is shown at 421, connected to rod 420 for entrance into openings 139, 140 of the jig shown in Figure 5. The free end of rod 420 is connected to one end of a lever 422 pivoted on table 86 at 423. The other end of the lever engages a cam 424 for successively causing the plate 419 and fingers 421 to engage the jig 120. Lever 422 is urged into engagement with cam 424 by means of a spring 425.

It will be noted from the foregoing that a jig 120 moved into appropriate position for receiving a second spacer plate at the fifth loading mechanism, has previously had mounted thereon a first mica, a grid, a cathode and anode. During transit from the fourth to the fifth loading mechanism, the grid and anode previously loaded extend upwardly from the jig, the anode being supported by the first loaded spacer plate and by the relatively short mandrels 131, 133 of the jig shown in Figure 5, and the grid being supported solely by its engagement with the spacer plate referred to. This leaves unsupported the end portions of these electrodes remote from the jig. This introduces hazards of displacements of these end portions during movement from one mechanism to the other, from positions thereof established when they were loaded. It is possible, therefore, that the accurate vertical registry between the loading head 397 and the jig 120 provided at the fifth loading mechanism may fail to provide an accurate vertical registry of the loading head with respect to the free ends of the electrodes previously loaded. Since the second spacer is to be loaded on such ends, it is necessary that the vertical registry thereof with the loading head be extremely accurate.

Accordingly, means are provided at the fifth loading mechanism for accurately locating the free ends of the previously loaded anode and grid. This means includes two movable slide members 426, 427 shown in Figures 27 and 28. The slide members referred to comprise upper plates 428, 429 fixed to lower plates 430, 431. The upper plates include portions 432, 433 shown in Figure 28 overhanging the adjacent edges of the lower plates 430, 431, and shaped to define tongues 434, 435, 436, 437 shown in Figure 27 and adapted to engage upper anode ears 74, 75, and recesses 438, 439 adapted to engage upper end portions of grid side rods 59, 60, of the previously mounted grid. The overhanging portions 432, 433 also serve a stripping function for stripping a completed electrode cage from loading head 397 after the second spacer plate has been loaded.

Slide member 426 is fixed to a slide plate 440 shown in Figure 25. Slide plate 440 is slidable on a track 441. Slide member 427 is fixed to a slide plate 442. Slide plate 442 is slidable on a track 443. For imparting sliding movement to plate 442, a rod 444 is connected to said plate and to one end of a lever 445. Lever 445 is pivoted at 423, and its other end extends below table 86 and into engagement with a cam 446. A spring 447 serves to keep the lever 445 in cam following engagement with cam 446.

For imparting sliding movement to slide plate 440, a lever 447 pivoted at 448 on a fixed bracket 449 has one end in engagement with a slot 450 provided in the slide plate and its other end in engagement with one end of a rod 451. The other end of rod 451 is connected to lever 445 adjacent the lever end connected to rod 444 previously mentioned. A spring 452 engages slide plate 441 for preventing backlash between lever 447 and the wall of slot 450 engaged by the lever.

It should be noted, before passing to a description of the operation of the fifth loading mechanism, that the surface 399 of the loading head 397 includes three recesses, 453, 454, 455, through which mandrels 405, 406, 407 aforementioned extend. The recesses 453 and 455 provide a space around mandrels 405, 407 for receiving upper ears 74, 75 of the previously loaded anode, the two mandrels referred to extending into passageways 72, 73 in the ears for further accurately locating the anode with respect to apertures 81, 82 in the second spacer plate, also engaged by mandrels 405, 407 during a loading of this spacer plate. The recess 454 provides a space for receiving end portions of grid side rods 59, 60, and an end portion of the cathode 63. The tapered mandrel 406 is adapted to extend into the upper end of the cathode during a loading of the second spacer plate for accurately locating the cathode with aperture 79 in said plate.

*Operation of the fifth loading mechanism*

It will be noted from Figure 29 that at zero position of the cams, lever 410 engages the upper dwell of cam 413, extending from 0° to 100°. During such engagement, the loading head 397 is in vertical registry with jig 120.

Lever 422 actuating the locating and locking members 419, 421, engages a lower dwell on cam 424 extending from 130° to 340°. This keeps the jig 120 accurately located and locked in vertical registry with loading head 397.

Lever 445 actuating slide members 426, 427 engages a lower dwell on cam 446, extending from 350° to 20°. This brings the slide members together, to engage upper end portions of the anode and grid previously loaded, as shown in Figure 27.

Lever 414 actuating the vertical movements of loading head 397 engages a portion of cam 418 at the beginning of a fall thereon extending to 20°.

Cam 402 engages vacuum valve 401 with a raised dwell thereon to keep the valve open to assure adherence to surface 399 of the loading head of the spacer plate to be loaded. Air pressure valve 403 is kept closed by engaging a lower dwell on cam 404.

A continuing rotation of shaft 102 on which the cams aforementioned are fixed, will impart the following movements to the mechanism parts referred to.

Rotation of cam 413 from 0° position to 100° will involve no motion of lever 410 and as a consequence, the loading head 397 will be kept in vertical registry with the jig 120. Rotation of cam 424 from 0° to 130° will cause no movement of lever 422 and therefore the locating plate 419 and locking fingers 421 will continue to engage the jig 120. Rotation of cam 418 through 20° will, however, cause the loading head 497 to be lowered for loading spacer plate 77. It will be noted that cam 446 has its lower dwell extending to 20°. Therefore, when the spacer plate is loaded, the slide members 426, 427 are in adjacent position and the spacer plate is loaded on top of these members as shown in Figure 27. The upper ends of the electrodes previously mounted extend above the slide members mentioned for engagement by apertures in the plate being loaded.

The lever 414 next engages a dwell portion on cam 418 extending from 20° to 50°. At the same time, a riser portion of cam 446 extending from 20° to 50° causes lever 445 to move to separate the slide members 426, 427, sufficiently to permit the spacer plate 77 to be moved downwardly past said members. This downward movement occurs when lever 414 engages the fall on cam 418 between 50° and 60° causing the loading head to drop. During this time, the dwell portion on cam 446 between 50° and 60° keeps the slide members aforementioned in separated positions.

It will be noted, on reference to cam 418 that two falls are provided from 50° to 60° and from 0° to 20°. This is occasioned by the fact that one downward movement of the loading head 397 is required when mounting the spacer plate on top of slide members 426, 427, and a second downward movement is necessary when completing the mounting operation with the slide members separated. A further reason for the two falls resides in the fact that the second downward movement of the loading head is required to fully seat the cathode on its annular embossments, and to snap the second spacer plate past the locking embossments or dimples on the upper anode ears. Furthermore, the second downward movement of the loading head causes the grid side rods to enter to a desirable degree in apertures of the two spacer plates therefore provided.

After the second downward movement of the loading head 397 referred to, the head is raised during engagement of lever 414 with riser portion of cam 418 extending from 60° to 100°. During the raising of the loading head, lever 445 engages a fall from 60° to 70° on cam 446, causing the slide members 426, 427 to move towards each other. This fall is of relatively small magnitude and serves to move the slide members to the positions shown in Figure 28. During such movement of the slide member, the overhanging portions 432, 433 thereof are moved into engagement with edge portions of the spacer plate 77 overhanging the surface 399 of the loading head for stripping the spacer plate from said surface.

It will be noted from cam 402, that when the loading head is first moved into close proximity to the slide members 426, 427, that the lower dwell portion of the cam from 45° to 200° is engaged by the vacuum valve 401. This causes the valve to close to facilitate release of the spacer plate being loaded. At 45° on cam 404, a riser portion begins which serves to open the valve 403 to the source of air under pressure. The valve is kept open from 60° to 80° which includes the time that the loading head is moved downwardly for the second time. The resultant air blast through openings 398 in the loading head further facilitates removal of the spacer plate 77 therefrom.

It will further be noted that cam 418 has a further fall from 180° to 210°. During engagement of lever 414 with this fall, lever 410 engages an upper dwell on cam 413 extending from 180° to 210° which serves to keep the loading head in vertical registry with the reservoir of spacer parts. The fall referred to on cam 418 causes the loading head to move downwardly to engage and pick up a spacer plate in the reservoir. During the dwell of the loading head in the reservoir from 210° to 230° on cam 418, the cam 402 opens vacuum valve 401, the opening being complete at the 215° mark on the cam. This causes the spacer plate engaged by the loading head to adhere to the surface 399 thereof, for a renewal of a cycle of operation of the apparatus.

*General control feature of the apparatus*

Figures 30 and 31 show general control features of the apparatus incorporating the invention. The control functions performed by the structure shown in Figure 30 have heretofore been described in connection with the several loading mechanisms of the apparatus.

Figure 31 shows a schematic electrical circuit diagram and depicts generally the electrical energizations to which various parts of the apparatus are subjected. A motor 112, connected to shaft 111 shown in Figure 3, is energized by leads 457, 458 forming a circuit across a positive voltage source and ground. A main switch 459 serves to close the motor energizing circuit. A starting and stopping switch 460 is also provided for conveniently starting and stopping the operation of motor 112. Switch 460 is connected across a circuit including a magnetic relay 461. When this circuit is closed, magnetic relay 461 is in position for keeping switches 462, 463 across leads 457, 458 in closed position. It also serves to keep switch 464 across the relay energizing circuit closed. When this circuit is opened, relay 461 is urged to a position for opening switches 462, 463, 464, at which time both the relay as well as the motor 112 are deenergized.

Connected across the relay energizing circuit aforementioned is photoelectric relay 349 shown in Figure 21, which is urged to closed position in the absence of light energization and which opens in response to such energization, from light source 348. A normally closed switch 351 is in parallel relation with respect to photoelectric relay 471, and is opened, as explained before herein, during a portion of the cycle of operation of the apparatus, to permit the relay 471 to open the circuit energizing magnetic relay 461, in the absence of an anode on a jig at a location past the anode loading mechanism.

Also connected across leads 457, 458 is a circuit including switch 234 for energizing a solenoid 462 for removing grid trays 212 shown in Figures 12 and 17. The circuit referred to also includes a switch 461, shown in Figure 17, for energizing solenoid 460, to return tray removing arms 222 and 223 to their initial positions.

Leads 463a, 464a connected across main leads 457, 458, serve three parallel circuits 465, 466, 467. Circuit 465 includes photo-electric relay 324 normally open in the absence of light energization, but adapted to close when so energized by the absence of an anode in the chute 320 shown in Figure 21. The closing of relay 324 closes the circuit energizing a vibrator motor 468 and causes the vibrating reservoir to supply more anodes to chute 320.

Circuit 466 includes photoelectric relay 179 shown in Figure 9, and an elevator means including a motor 469 for intermittently raising the spacer plates in reservoir 156 in accordance with the depletion thereof by the loading member. The relay 179 closes in response to light energization from light source 178 in the absence of spacer plates between the light source and relay referred to. Such closing of the relay serves to raise the spacer plates back to a required level.

Circuit 467 is similar to circuit 466 and is responsive to the spacer level in the reservoir serving the second spacer loader. It includes a photoelectric relay 470 and a motor 471 for elevating a stack of spacer plates in the aforementioned reservoir, not shown, in response to the depletion thereof by the fifth loading mechanism heretofore described. A light source 472 serves to energize the relay 470 to cause it to close circuit 467 and actuate motor 471 to raise the level of the spacer stack in the reservoir to a height where it blocks light from the light source 472. This opens the relay 467 and motor 471 stops.

It is apparent from the foregoing description of an automatic mounting apparatus embodying the invention, that a novel and advantageous apparatus is provided, not only for mechanizing operations that have heretofore been performed manually, but more importantly, for more accurately and more uniformly mounting electrode cage parts to form considerably improved electrode cages adapted to contribute to better operation of electron tubes in which the improved cages are used.

What is claimed is:

1. Apparatus for automatically loading a part to form an assembly, comprising a jig movable in a predetermined path, two locating mechanisms spaced in said path, means for actuating one of said mechanisms into engagement with said jig for accurately locating said jig in a position to receive said part, means adjacent to said position for loading said part on said jig, and means for actuating the second of said mechanisms into engagement with the loaded part for accurately locating said part, whereby said part is in a position for buildup thereon of a second part.

2. In an apparatus for automatically mounting parts to form an assembly, a jig and means for mounting an initial part on said jig, said means comprising a first locating member adapted to engage and orient said jig in a predetermined position, a loading device adapted to load said part on said jig in said position, and a second locating member adjacent to said first locating member and adapted to engage said part after the said part has been loaded, for accurately locating said part in a second predetermined position, whereby a second part is adapted to be loaded on said initial part in said second position.

3. Apparatus for assembling parts to form an assembly, comprising a loading member, a jig movable to a position adjacent to said loading member, a first orienting means adjacent to said loading member and movable to engage said jig for accurately orienting said jig with respect to said loading member, a second orienting means adjacent to said first orienting means and including a movable member adapted to engage a part previously loaded on said jig for accurately orienting said part on the jig in a position for receipt by the jig of a further part from said loading member in build-up relation with respect to said previously loaded part, said first and second orienting means and said loading member being mechanically interlocked for operation in the sequence named, and power transfer means connected to said first orienting means for performing said operations in said sequence.

4. Apparatus for automatically mounting parts to form an electrode cage, comprising a loading mechanism adapted to automatically load one of said parts into accurate engagement with previously loaded parts, a jig adjacent said loading mechanism adapted to support said previously loaded parts, said loading mechanism including a loading member movable in a predetermined path to a parts transfer position adjacent said jig, oppositely disposed members movable to engage opposite side portions of said previously loaded parts to dispose said parts in said path, and common means for successively actuating said members and said loading member, whereby said previously loaded parts are disposed in said path before said loading member is in said parts transfer position for loading said one of said parts into said accurate engagement with said previously loaded parts.

5. Apparatus for automatically mounting parts to form an electrode cage, comprising a movable parts-receiving jig, a plurality of spaced parts-loading mechanisms, and means for moving said jig into a parts-receiving position adjacent each of said loading mechanisms, one of said loading mechanisms being adapted to load a final part to be mounted, and including means for transporting said final part to said jig in a predetermined path, movable means adjacent said one of said mechanisms adapted to engage parts loaded on said jig prior to said final part and to orient said loaded parts accurately prior to a loading of said final part, and a common power transfer means connected to said means for moving the jig, said movable means, and said means for transporting, for actuating said last named three means in the order named, for precision build-up of said parts on said jig.

6. Apparatus for automatically assembling parts to form a desired composite structure, comprising a plurality of spaced mounting fixtures movable in a predetermined path, means connected to said fixtures for intermittently moving the fixtures in said path to dispose them successively and momentarily in a predetermined position in said path, means adjacent to said path for locking said fixtures in said position, means adjacent to said position for loading a part on a previously loaded part, locating means at said position adapted to engage and locate said previously loaded part in a predetermined location, and guide means at said position for guiding the first named part toward a seated relation with respect to said previously loaded part for forming said structure, said fixtures, locking means, locating means, guide means, and loading means being mechanically connected for actuation in the sequence named by said means for moving.

7. An automatic assembling apparatus comprising a jig, a support movable in a given path and carrying said jig, a first loading means adjacent to said path and carrying a first part to be loaded, a first means connected to said support for orienting said jig in a relatively low order of accuracy with respect to said first loading means, a second means movable to engage said jig for orienting the jig in a relatively high order of accuracy with respect to said loading means, a third means spaced from said first and second means in said path and adapted to engage said first part for orienting the same in a position of greater accuracy than said relatively high order of accuracy on said jig, a second loading means adjacent to said third means and adapted to load a second part on said jig in a path including said position of greater accuracy, said first and second means, said first loading means, said third means and said second loading means being mechanically interconnected for operation in the sequence named, and power transfer means connected to said first means for initiating and completing said operations in said sequence.

8. Apparatus for automatically loading parts to form a three electrode cage for an electron discharge device, comprising a plurality of spaced mounting fixtures movable in a horizontal path, means for intermittently moving said fixtures in said path to dispose them successively and momentarily in spaced stationary positions in said path, means adjacent said path for locking said fixtures in said stationary positions, means adjacent one of said stationary positions for loading an electrode on a previously loaded spacer plate, locating means at said one of said stationary positions for locating said spacer plate in a predetermined position, means comprising a combined guide and locator at said one of said stationary positions for locating said electrode in desired position with respect to said located spacer plate, and common actuating means adjacent said locking means loading means locating means, and combined guide and locator means, for actuating said four means in predetermined sequence.

9. Apparatus according to claim 8 and wherein said loading means comprises a grid loader including a support, a tray mounted on said support for supporting grids substantially horizontally and in spaced relation, an arcuate chute including horizontal portion having an entrance for receiving a grid and a vertical delivery portion for delivering a grid to one of said fixtures in upright position, means for intermittently moving said tray across said entrance to dispose a grid in registry therewith, and means for urging said grid into said entrance, through said chute and towards said fixture.

10. Apparatus for automatically mounting electron tube parts to form an electrode cage, comprising a jig movable to a predetermined position, a loading mechanism for loading an insulating spacer plate having apertures on said jig and into build-up relation with respect to a previously loaded electrode sub-assembly having free end portions remote from said jig and adapted to be received in said apertures, a locating device between said loading mechanism and said jig when said jig is in said position, said device being movable to engage and locate said free end portions in a predetermined orientation, said loading mechanism being adapted to carry said spacer plate in said path with said apertures in said predetermined orientation and aligned with said end portions, and power means including a plurality of interconnected power transfer mechanisms connected to said jig, locating device and loading mechanism for sequential movement thereof in the order named for accurate loading of said spacer plate for build-up of said cage.

11. In an apparatus for automatically assembling an electrode cage from parts thereof, comprising a loading means disposed in a predetermined position, a movable jig having one of said parts loaded thereon, means for moving said jig roughly into said position, a first locating device adjacent to said loading means and connected to said means for moving for engaging said jig when roughly in said position and moving said jig more accurately into said position, and a second locating device adjacent to said loading means and connected to said first locating device and adapted to engage said one of said parts after said jig is moved more accurately into said position for disposing said one of said parts in accurate part-receiving relation to said loading means for accurate build-up on said one of said parts of another part loaded by said loading means, said loading means being connected to said means for moving, for loading said another part on said jig and into a predetermined relation to said one of said parts, after said jig and said one of said parts have been moved into accurate positions in relation to said loading means by said first and second locating devices.

12. Apparatus for automatically mounting electron tube parts to form an electrode cage, comprising a jig movable to a predetermined position, a loading mechanism adjacent to said position and having a movable loading member adapted to load a second part on said jig and into build-up relation with a first part previously loaded on said jig, a first locating member at said position movable to engage said jig when said jig is roughly in said position for more accurately locating said jig and said first part with respect to said loading mechanism, a second movable locating member at said position adapted to engage said first part for yet more accurately locating said first part with respect to said loading mechanism, a power transfer mechanism comprising a rotatable shaft having a plurality of cams fixed thereto, said cams having riser portions angularly spaced in a predetermined order around said shaft in one angular direction, said jig, first locating member, second locating member and said loading mechanism being connected to said cams in said predetermined order, and means for rotating said shaft in an angular direction opposite to said first direction, whereby said jig, first and second locating members and loading mechanism are actuated in the order named for an improved loading operation.

13. Apparatus for automatically loading a part to build up an assembly, comprising a jig adapted to receive said part, a loading mechanism adjacent to said jig, said mechanism including a chute having an end aligned with said jig, a first impeller remote from said jig adapted to forcefully urge said part through said chute at a relatively high velocity, said chute being curved to frictionally reduce said velocity, whereby said part is preserved from a velocity induced rebound from said jig, and a second impeller adjacent to said chute end and adapted to engage said part for controlling a seating of said part on said jig.

14. A feeding device comprising an elongated support, a plurality of trays stacked substantially vertically on a portion of said support spaced from one end thereof, said trays having troughs adapted to support in spaced relation articles to be fed, a chute having an opening adjacent a side of said support and in axial registry with a trough in the lowest of said trays, means adjacent the other side of said support for impelling an article in said trough into said chute, means for intermittently moving said lowermost of said trays towards said one end of said support to successively bring the troughs thereof into registry with said chute opening and to cause the next higher of said trays to drop to said support, and means adjacent said one end of the support for removing said lowermost tray from said support, whereby said trays are successively moved across said chute opening with the troughs thereof successively in registry with said opening for feeding articles in said troughs to said chute.

15. Apparatus for assembling parts to form an assembly, comprising a loading means, a jig movable to a position adjacent to said loading means, said loading means including a carrier and an impeller for impelling a part carried by said carrier to said jig, a first orienting means adjacent to said impeller for accurately orienting said jig in part receiving relation to said impeller, a second orienting means adjacent to said first orienting means and adapted to engage a part previously loaded on said jig for accurately orienting said part in a position on said jig for accurate build-up thereon of a part served by said loading means, said first and second orienting means and said impeller being mechanically connected for operation in the sequence named, said carrier being mechanically connected to said impeller for engagement by said impeller of a part carried by said carrier, and power transfer means connected to said first orienting device for initiating said sequence of operation.

16. A feeding device comprising an elongated support, a plurality of elongated trays having troughs extending thereacross, said trays being stacked vertically on a portion of said support spaced from one end thereof with said troughs disposed substantially horizontally, whereby articles are adapted to be supported substantially horizontally in said troughs, a receiving member spaced from said support and adapted to receive said articles in vertical position, an arcuate chute between said support and said member and having a substantially horizontal open end portion adjacent said support and a substantially vertical open end portion adjacent said member, means engaging the lowermost of said trays for disposing the troughs thereof successively in axial registry with said horizontal open end portion, means for successively impelling into said chute articles in said troughs when in said axial registry, means for restraining movement of the other of said trays, whereby said lowermost tray is moved to said one end of said support and the next higher tray drops to said support, means responsive to the movement of said lowermost tray to said one end of the support for removing said lowermost tray from said support, and movable means adjacent the vertical end portion of said chute adapted to engage an article in said chute and urge the article to said member.

17. A grid loading mechanism including a movable support for a plurality of grids, a track for said support, a jig adapted to receive a grid, a chute having an open end adjacent to a position in proximity to said jig when said jig is in parts receiving position with respect to said grid loading mechanism, means for moving said support on said track in a predetermined path to dispose said grids successively in registry with said open end, said track extending across said open end, and means adjacent one end of said track and responsive to a terminal movement of said support for moving said support away from said track.

18. In an apparatus for assembling an electrode cage, a jig movable to a loading position, a first means at said position adapted to load in spaced relation with respect to said jig a grid having a side rod, a second means at said position adapted to engage opposite sides of said jig for accurately locating said jig in a predetermined position, whereby said side rod is adapted to be disposed in register with an aperture in a spacer plate previously loaded on said jig, a third means adjacent to said locating means and adapted to engage and push said side rod towards said jig while preserving said register, whereby said side rod is adapted to be moved into said aperture, and a fourth means connected to said first, second and third means for actuating the same in the sequence named.

19. Apparatus for automatically mounting electron tube parts to form an electrode cage, comprising a jig movable to a predetermined position, a cathode loading mechanism adjacent to said position and adapted to load a cathode on said jig and into parts-build-up relation with a wound type grid previously loaded on said jig, a location device disposed between said loading mechanism and said jig when said jig is in said position, said locating device including a member movable to form a chute for receiving said cathode and to engage and accurately locate said grid in co-axial relation to said chute, and means connected to said jig, movable member and loading mechanism for movement thereof in the order named.

20. Apparatus for assembling an electrode cage, comprising a mechanism adapted to load a tubular grid on an assembling fixture, said mechanism including a track, a movable support on said track adapted to support in axially horizontal and parallel relation a plurality of tubular grids, a chute having an open receiving end adjacent said track and between the ends of said track, means for moving said support from one end of said track to the other for successively disposing grids on said support in axial registry with said open receiving end, means for urging a grid in said axial registry into said open receiving end, and means adjacent said other end of said track responsive to movement of said support to a position relatively close to said other end for removing said support from said track, whereby said track is free to receive another support.

21. Apparatus for automatically mounting electron tube parts to form an electrode cage, comprising a jig movable to a predetermined position, an anode loading mechanism adjacent to said position and adapted to load a tubular anode on said jig and into parts-build-up relation with respect to a previously loaded electrode subassembly comprising a spacer plate having apertures, a wound grid having side rods extending into some of said apertures and a cathode extending through another of said apertures, a device between said loading mechanism and said jig when in said position and having members movable to simultaneously engage the side rods of said grid for orienting said cathode and grid in concentric relation and to form a chute coaxial with said concentric cathode and grid, and power means including a plurality of interconnected power transfer mechanisms connected to said jig, device and loading mechanism for sequential movement thereof in the order named for accurate loading of said anode in build-up relation to said sub-assembly.

22. Apparatus for automatically mounting electron tube parts including a wound type grid having side support rods, to form a triode type of electrode cage, said apparatus comprising a movable fixture for receiving said parts, a grid loading mechanism, and means for moving said fixture into parts-receiving relation with respect to said grid loading mechanism, said loading mechanism including a reservoir of grids, a chute between said reservoir and said fixture when in said parts receiving relation, means adjacent said reservoir for impelling a grid in said reservoir into an end of said chute, means adjacent said fixture when in said relation to engage a previously mounted part for orienting said part into accurate registry with the other end of said chute, and means adjacent said other end of the chute movable successively into and along said chute and adapted to engage the side rods only of said grid in said chute for urging said grid into predetermined engagement with said previously mounted part.

23. Apparatus for assembling an electrode cage, comprising a movable jig adapted to receive parts to form said cage, a loading position, means to move said jig to said loading position, means to lock said jig against movement at said loading position, means at said loading position to load a grid having side rods on said jig, said last named means comprising a movable reservoir adapted to support a plurality of grids with said side rods disposed substantially horizontally, a chute having an open receiving end adjacent said reservoir, and an open delivery end adjacent said jig when in said loading position, means for moving said reservoir across said open receiving end to dispose a grid in axial registry therewith, means for urging said grid into said open receiving end and to said open delivery end for mounting said grid on said jig, and means adjacent said jig in said loading position adapted to engage said side rods for accurately positioning said grid on said jig.

24. Apparatus for automatically mounting electron tube parts including a wound type grid to form an electrode cage, said apparatus comprising a mechanism for loading said grid, said mechanism including an elongated horizontal support, a plurality of elongated trays stacked in a vertical array on a portion of said support, each of said trays having a plurality of troughs extending thereacross and adapted to support a plurality of grids in spaced relation, a chute having a receiving end adjacent one side of said support, means for moving the lower only, of said trays along and to one end of said support to dispose the troughs thereof successively in registry with said receiving end, means adjacent the other side of said support and in registry with said receiving end for impelling into said receiving end a grid disposed in a trough between said receiving end and said impelling means, and means engaging said lower trough when adjacent said one end for stacking said tray in a horizontal array spaced from said support.

25. Apparatus for automatically mounting parts to form a triode type of electrode cage, comprising a movable parts receiving fixture, loading mechanism, comprising a structure adapted to load on said fixture one of said parts comprising a wound type grid having side support rods, said structure comprising a reservoir for a plurality of said grids, said reservoir comprising an elongated tray having transverse parallel troughs, each of said troughs being adapted to support one of said grids in spaced relation with respect to the others of said grids, a support, said trough being mounted on said support, a chute having a receiving end adjacent said support, means adjacent said support for impelling into said receiving end a grid in one of said troughs in registry with said receiving end, and power transfer means connected to said fixture and to said loading mechanism for first moving said fixture to a position adjacent to said loading mechanism, then for moving said support to dispose one of said troughs in registry with the receiving end of said chute, and then for actuating said impelling means.

26. A feeding device for feeding wound type grids having side rods, comprising a reservoir of said grids including a support, a tray having troughs for supporting said grids in spaced relation, a grid receiving member, a chute having an entrance end adjacent said support and an exit end adjacent said grid receiving member, a nozzle adjacent said support, a valve controlling compressed air feed to said nozzle, common power means for intermittently moving said tray to dispose the troughs thereof successively in grid transfer relation to said entrance end of the chute and adjacent said nozzle and to open said valve only when said troughs are in said grid transfer relation, whereby the grids in said troughs are resiliently impelled by jets of air from said nozzle into said chute, the pressure of said air feed being relatively low to preserve said grids from deformation, whereby said grids are impelled relatively slowly through said chute, and means adjacent the exit end of said chute adapted to engage the side rods only, of said grids for urging said grids into a forced seated position on said grid receiving member.

27. Apparatus for assembling an electrode cage, comprising a loading means for loading a grid, said loading means including an arcuate chute having a portion in tangent relation to a substantially horizontal line, said portion having an open receiving end, said chute having another portion in tangent relation to a substantially vertical line, said another portion having an open delivery end; a movable support for a plurality of grids adjacent said open receiving end; movable jig adapted to receive one of said grids; and means for moving said jig into registry with said open delivery end; said loading means including means for propelling one of said grids into said open receiving end, through said chute and the open delivery end thereof to a position adjacent said jig, means adjacent said jig in said registered position thereof adapted to engage opposite sides of said grid for accurately positioning said grid on said jig, and means adjacent said open delivery end of the chute for urging said grid to a predetermined seated position on said jig.

28. Apparatus for assembling an electrode cage, comprising a movable jig adapted to receive parts to form said cage, a loading means for loading a grid, means for moving said jig to parts receiving relation with respect to said loading means, said loading means including a chute having an open receiving end and an open delivery end, said open delivery end being in registry with said jig when said jig is in said parts receiving relation, a movable support for a plurality of grids adjacent said open receiving end, means for moving said support to dispose one of said grids in registry with said open receiving end, means for directing an air blast against said one of said grids to propel said one of said grids into said open receiving end and through said chute and towards said jig, means adjacent said jig adapted to engage opposite sides of said one of said grids for accurately orienting the same in one plane, and means adjacent said delivery end of said chute adapted to engage one end of said one of said grids for accurately orienting the same in a plane perpendicular to said one plane and in seated position on said jig.

29. Apparatus for automatically mounting electron tube parts to form an electrode cage, comprising a jig movable to a predetermined position, a grid loading mechanism adjacent to said position and adapted to load on said jig and into parts build-up relation to a flat insulating spacer plate having two apertures and previously loaded on the jig a grid having two side rods, said loading mechanism including a movable control element and chute having a delivery end, a locating device having two members movable with respect to said chute and adapted to engage said insulating plate for accurately disposing said plate in a predetermined relation with respect to said delivery end of the chute to assure entrance of said side rods into said apertures in the plate, a rotatable shaft having a plurality of cams spaced angularly therearound in one angular direction and connected to said jig, locating device loading mechanism and control element in the order named, and means for rotating said shaft in an angular direction opposite said one direction, for first moving said jig to said predetermined position, then moving said members of the locating device to accurately position said insulating plate, and finally moving said control element for loading said grid into said chute and onto said jig, for automatic build-up of said grid on said insulating plate.

References Cited in the file of this patent
UNITED STATES PATENTS 1,920,630    Conn  -----------------  Aug. 1, 1933